US006952476B1

(12) United States Patent
Mao

(10) Patent No.: US 6,952,476 B1
(45) Date of Patent: Oct. 4, 2005

(54) VERIFICATION OF THE PRIVATE COMPONENTS OF A PUBLIC-KEY CRYPTOGRAPHIC SYSTEM

(75) Inventor: Wenbo Mao, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/913,003

(22) PCT Filed: Feb. 8, 2000

(86) PCT No.: PCT/GB00/00370

§ 371 (c)(1),
(2), (4) Date: Aug. 8, 2001

(87) PCT Pub. No.: WO00/48359

PCT Pub. Date: Aug. 17, 2000

(30) Foreign Application Priority Data

Feb. 8, 1999 (GB) .................................... 9902687

(51) Int. Cl.[7] .............................. H04L 9/30; H04L 9/32
(52) U.S. Cl. ......................... 380/30; 380/277; 713/169
(58) Field of Search ................................ 713/168, 169, 713/200, 201; 380/28, 30, 277, 44

(56) References Cited

U.S. PATENT DOCUMENTS

| 4,405,829 A | 9/1983 | Rivest et al. ............... 178/22.1 |
| 4,633,036 A | 12/1986 | Hellman et al. ......... 178/22.11 |
| 6,411,715 B1 * | 6/2002 | Liskov et al. ............... 380/277 |

FOREIGN PATENT DOCUMENTS

| EP | 0 202 768 A2 | 11/1986 |
| EP | 0 534 420 A2 | 3/1993 |

OTHER PUBLICATIONS

Mao, Wenbo. "Fast Monte-Carlo Primality Evidence Shown in the Dark", Hewlett-Packard Company, Oct. 27, 1999.*
Berger, Richard, et al., "A Framework for the Study of Cryptographic Protocols," *Advances in Cryptology-Proceedings of CRYPTO 85, Lecture Notes in Computer Science*, Springer-Verlag, pp. 87-103 (Aug. 1985).
Blum, Manuel, "Coin flipping by telephone: a protocol for solving impossible problems," *Proceedings of 24th IEEE Computer Conference (CompCon)*, pp. 133-137 (Feb. 1982).
Goldwasser, Shafi, "Multi-Party Computations: Past and Present," *Proceeding of the 16th Annual ACM Symposium on Principles of Distributed Computing*, pp. 1-6 (Aug. 1997).
Camenisch, Jan and Michels, Markus, "Proving in Zero-Knowledge that a Number is the Product of Two Safe Primes," *Advances in Cryptology-EUROCRYPT 99, Lecture Notes in Computer Science*, Springer-Verlag, 1592, pp. 106-121 (1999).

(Continued)

Primary Examiner—Andrew Caldwell
Assistant Examiner—Zachary Davis

(57) ABSTRACT

A method of exchanging digital public-key verification data whereby a first computing entity (102) enables a second computing entity (104) to obtain probabilistic evidence that a given public-key number n is the product of exactly two odd primes p and q, not known to the second party, whose bit lengths (l(p), l(q)) differ by not more than d bits. The method provides an efficient proof of knowledge protocol for demonstrating Monte-Carlo evidence that a number n is the product of two odd primes of roughly equal size. The evidence is shown "in the dark", which means that the structure is verified without the prime factors of n disclosed. The cost of a proof amounts to $12k\log_2 n$ multiplications of integers of size of n where k is the number of the iterations in the proof and relates to an error probability bounded by $\max(\frac{1}{2}^k, 24/n^{1/4})$.

14 Claims, 9 Drawing Sheets

OTHER PUBLICATIONS

Liskov, Moses and Silverman, Robert D., "A Statistical Limited-Knowledge Proof for Secure RSA Keys," *5th ACM Conference on Computer and Communications Security*, IEEE P1363 Research Contributions, pp. 1-14 (1998).

Damgard, Ivan Bjerre, "Practical and Provable Secure Release of a Secret and Exchange of Signatures," *Advances in Cryptology-Proceedings of EUROCRYPT 93, Lecture Notes in Computer Science*, Springer-Verlag, 765, pp. 200-217 (1994).

Karanakis, E., *Primality and Cryptography*, Wiley-Teubner Series in Computer Science, John Wiley & Sons, p. 28 (1986).

Blackburn, S.R. and Galbraith, Steven D., "Certification of Secure RSA Keys," *Technical Report CORR 90-44*, University of Waterloo Centre for Applied Cryptographic Research, pp. 1-10 (May 6, 1999).

Boyar, Joan, et al., "Practical Zero-Knowledge Proofs: Giving Hints and Using Deficiencies,." *Advances in Cryptology-Proceedings of EUROCRYPT 89, Lecture Notes in Computer Science*, Springer-Verlag, 434, pp. 155-172 (1990).

Galil, Zvi, et al., "A Private Interactive Test of a Boolean Predicate and Minimum-Knowledge Public-Key Cryptosystems," *26th FOCS*, pp. 360-371 (1985).

Gennaro, Rosario, et al., "An Efficient Non-Interactive Statistical Zero-Knowledge Proof System for Quasi-Safe Prime Products," *5th ACM Conference on Computer and Communications Security*, pp. 1-13 (Oct. 1998).

Van de Graaf, Jeroen and Peralta, Rene, "A Simple and Secure Way to Show the Validity of Your Public Key," *Advances in Cryptology-Proceedings of CRYPTO 87, Lecture Notes in Computer Science*, Springer-Verlag, 293, pp. 128-134 (1988).

ISO/IEC 9798-3, "Information technology—Security techniques—Entity authentication mechanisms; Part 3; Entity authentication using a public key algorithm," International Organization for Standardization, Geneva, Switzerland, pp. 1-9 (1993)

Micali, Silvio, "Fair Public-Key Cryptosystems," *Advances in Cryptology-Proceedings of CRYPTO 92, Lecture Notes in Computer Science*, Springer-Verlag, 740, pp. 113-138 (1993).

Solovay, R. and Strassen, V., "A Fast Monte-Carlo Test for Primality," *SIAM Journal of Computing*, vol. 6, No. 1, pp. 84-85 (Mar. 1977).

* cited by examiner

VERIFICATION OF THE PRIVATE COMPONENTS OF A PUBLIC-KEY CRYPTOGRAPHIC SYSTEM

TECHNICAL FIELD

This invention relates to apparatus and methods for verifying the private components of a public-key cryptographic system.

BACKGROUND TO THE INVENTION

Electronic commerce plays an increasingly important role in modern society and necessarily involves the transmission of electronic data between two parties. In a commercial environment, a first party may wish to transmit electronic data to a second party over an intervening communications network, in particular the internet, only when confident that there is adequate security against eavesdroppers that may be present on the network. The parties may be computer entities, for example.

One way to achieve this is for the first party to encrypt the data in a manner that only the second party can decrypt after receipt. One class of such encryption techniques, and with which the present invention is concerned, is public-key cryptography based on the computational difficulty of factoring large integers. The first party encrypts a message by use of a public-key published by the second party the crypted message only being practicably decrypted by use of corresponding private components of the key held by the second party. These techniques include the well-known RSA cryptosystem, for example.

In many cases, the first party will not wish to use the encryption system without being confident that the public-key to be used to encrypt the data conforms to an agreed set of criteria related to the security of the encryption to be obtained. One way to achieve this is to seek a certificate from a trusted certification authority that has verified to its own satisfaction that the public-key does so conform. An alternative way is for the first party to seek verification directly from the second party. Whatever the route to verification, the owner of the public-key generally prefers, and it is often a requirement of the encryption standard adopted, that the proof that the public-key is as it is claimed is achieved without revealing the private component to the verifier. That is, the proving party runs what is called a protocol with the verifying party that provides a 'knowledge proof' of the validity of the private components. For instance, the ISO standardization document 9798 part 3 recommends that public-key certification include knowledge proof for possession of the private component that matches the pubic key to be certified.

An example of such a set of criteria known to provide a highly secure public-key is that the public-key is an integer (n) which is the product of only two odd primes (p,q) and that the primes have lengths in bits which differ by no more than a predetermined value, d, commonly equal to 2.

Given the computational intractability of factoring large integers, there exists no known algorithm that can be input a given number n and terminate in a polynomial time in the size of n with an output answering whether n is the product of exactly two odd primes. Nevertheless, there do exist practically efficient interactive protocols that run in polynomial time and allow a prover who knows the factorization of n to prove such a structure to the satisfaction of a verifier without disclosing the factorization information to the latter.

An early idea for proving n in such a structure is based on an observation due to Adleman [see R. Berger, S. Kannan and R. Peralta. A framework for the study of cryptographic protocols, Advances in Cryptology—Proceedings of CRYPTO 85 (H. C. Williams ed.), Lecture Notes in Computer Science, Springer-Verlag 218 (1986), pp. 87–103]. He suggested using the fact that if n has exactly two different prime factors (which may include their powers) then exactly a quarter of the elements in the multiplicative group mod n are quadratic residues (square numbers of n). On the other hand, if n has more than two prime factors then at most one-eighth of them are quadratic residues. Thus a prover, knowing the factorization of n, can show a verifier the structure via binomial trials that for a set of k elements randomly chosen from the multiplicative group mod n, roughly k/4 of them are quadratic residues (shown by disclosing to the verifier their square roots). Using a normal distribution as an approximation to the probability of binomial trials (a standard method), Berger et al [R. Berger, S. Kannan and R. Peralta. A framework for the study of cryptographic protocols, Advances in Cryptology—Proceedings of CRYPTO 85 (H. C. Williams ed.), Lecture Notes in Computer Science, Springer-Verlag 218 (1986), pp. 87–103] established that if $$\frac{\sqrt{21}-1}{20}k$$

or more such elements are shown to be quadratic residues then the proof should be accepted with the probability of error between $e^{-k/74}$ and $e^{-k/75}$. Thus, k should be in thousands (k=3000 was suggested in [R. Berger, S. Kannan and R. Peralta. A framework for the study of cryptographic protocols, Advances in Cryptology—Proceedings of CRYPTO 85 (H. C. Williams ed.), Lecture Notes in Computer Science, Springer-Verlag 218 (1986), pp. 87–103]) in order for the error probability to be negligibly small. (We note $e^{-3000/74} < \frac{1}{2}^{58} < e^{-3000/75}$ and regard an amount at this level to be negligibly small). Since the cost for computing a square root mod n is measured by $O(\log_2 n)$ multiplications of integers mod n, the total cost for proving the two-prime-product structure of a number n by showing quadratic residue information will be $O(k \log_2 n)$ (multiplications mod n) with an error probability between $e^{-k/74}$ and $e^{-k/75}$.

Van de Graaf and Peralta [J. van de Graaf and R. Peralta. A simple and secure way to show the validity of your public-key, Advances in Cryptology—Proceedings of CRYPTO 87 (E. Pomerance, ed.), Lecture Notes in Computer Science, Springer-Verlag 293 (1988), pp. 128–134] observed that if n is a Blum integer, that is, n is the product of two distinct prime factors (again this may include their powers), both congruent to 3 mod 4, then any element in the multiplicative group mod n with the positive Jacobi symbol has the property that either itself or its negation is a quadratic residue modulo n. Their protocol for proof of Blum integer is based on this fact. A number of other previous protocols for proving two-prime-product structure also use this idea (e.g., [J. Camenisch and M. Michels. Proving in zero-knowledge that a number is the product of two safe primes, In Advances in Cryptology—EUROCRYPT 99, Lecture Notes in Computer Science, Springer-Verlag 1592 (1999), pp. 106–121, R. Gennaro, D. Miccianicio and T. Rabin. An efficient non-interactive statistical zero-knowledge proof system for quasi-safe prime products, In 5$^{th}$ ACM Conference on Computer and Communications Security, October 1998, M. Liskov and R. D. Silverman. A statistical limited-knowledge proof for secure RSA keys, IEEE P1363 Research Contributions]). Note that provided n is not a square number (which is easy to test against), exactly half of the elements in the multiplicative group mod n can have a positive Jacobi symbol which is also easy to evaluate. Thus, given such n, the above demonstration actually shows that a quarter of elements in the group are quadratic residues (since a quadratic residue must have positive Legendre symbol mod all prime factors, and only half of elements mod a prime have positive Jacobi symbol). If n is not in a two-prime-product structure then it is certainly not a Blum integer. Omitting details, for any group element of positive Jacobi symbol mod such n (which is non-Blum and non-square), a prover will have at most a 50% chance of correctly demonstrating the above. Clearly, such a proof using k random challenges will result in an error probability bounded by $\frac{1}{2}^k$, which approaches zero much faster than $e^{-k/74}$. (See the comparison between them in the previous paragraph).

The simplest way to show quadratic residue evidence to display a square root of a quadratic residue. In the protocol of Van de Graaf and Peralta for proving Blum integer, the verifier should check that the Jacobi symbol of a square root of a random challenge comply with a pre-agreed random sign. This follows Blum's observation that if n is a Blum integer, then any quadratic residue has square roots of positive and negative Jacobi symbols [M. Blum. Coin flipping by telephone: a protocol for solving impossible problems, Proceedings of $24^{th}$ IEEE Computer Conference (CompCon(, 1982, pp. 133–137.]. In the protocol of Gennaro et al [R. Gennaro, D. Miccianicio and T. Rabin. An efficient non-interactive statistical zero-knowledge proof system for quasi-safe prime products, In $5^{th}$ ACM Conference on Computer and Communications Security, October 1998.], a verifier should require that for each challenge g sent as challenge, a square root of either ±g or ±2g mod n will be replied. It is possible for a prover to correctly respond to such challenges if one of the prime factors of n is congruent to 5 mod 8, and the other to 7 mod 8. These form an additional constraint to n being a Blum integer.

Note that two different square roots of a quadratic residue mod n can lead to factoring n with a non-trivial probability. So it will be dangerous for a prover to disclose a square root of a challenge which is solely selected by the verifier. The two protocols in R. Gennaro, D. Miccianicio and T. Rabin. An efficient non-interactive statistical zero-knowledge proof system for quasi-safe prime products, In $5^{th}$ ACM Conference on Computer and Communications Security, October 1998 J. van de Graaf and R. Peralta. A simple and secure way to show the validity of your public-key, Advances in Cryptology—Proceedings of CRYPTO 87 (E. Pomerance, ed.), Lecture Notes in Computer Science, Springer-Verlag 293 (1988), pp. 128–134 assume the existence of mutually trusted random source which is accessible be the prover and verifier. The applicant believes that it will be costly to implement a mutually trusted random source between two mutually untrusted parties. The cost can be estimated by a protocol that allows the two parties to generate mutually trusted random elements without using a trusted third party. Blum's idea of coin flipping [M. Blum. Coin flipping by telephone: a protocol for solving impossible problems, Proceedings of $24^{th}$ IEEE Computer Conference (CompCon), 1982, pp. 133–137.] is such a protocol and is used by R. Berger, S. Kannan and R. Peralta. [A framework for the study of cryptographic protocols, Advances in Cryptology—Proceedings of CRYPTO 85 (H. C. Williams ed.), Lecture Notes in Computer Science, Springer-Verlag 218 (1986), pp. 87–103, Z. Galil, S. Haber and M. Yung. A private interactive test of a boolean predicate and minimum-knowledge public-key cryptosystems, $26^{th}$ FOCS, 1985, pp. 360–371]. Each instantiation of that protocol generates a truly random bit. Each random challenge of size of n generated this way takes $\log_2 n$ iterations and the same number of multi-precision operations of integers mod n (evaluation of $\log_2 n$ Jacobi symbols). Together k $\log_2 n$ iterations are needed for merely agreeing on k mutually trusted random challenges.

Above we have analyzed the cost for the previous protocols to prove an integer in the two-prime-power structure, i.e., $n=p^r s^s$ where p, q are distinct primes and r, s, integers. To further prove r=s=1 one can use the protocol of Boyar et al [J. Boyar, K. Friedl and C. Lund. Practical zero-knowledge proofs: Giving hints and using deficiencies, Advances in Cryptology—Proceedings of EUROCRYPT 89 (J.-j. Quisquater and J. Vandewalle, eds.), Lecture Notes in Computer Science, Springer-Verlag 434 (1990), pp. 155–172.] for proving square-free integers. Furthermore, to show that p and q are roughly equal size one can use Damgard's method of "checking commitment" protocol [I. B. Damgard. Practical and provably secure release of a secret and exchange of signatures, Advances in Cryptology: Proceedings of EUROCRYPT 93 (T. Helleseth, ed.), Lecture Notes in Computer Science, Springer-Verlag, 765 (1994), pp. 201–217.]. However, the costs of applying these two additional protocols will be ignored because they are less expensive than that for proving the two-prime-power structure, in particular for the case of non-Blum integers.

Solovay and Strassen disclosed, in an article titled "A Fast Monte-Carlo Test for Primality" SIAM J. COMPUTING Vol 6, No 1, March 1977, an efficient Monte-Carlo test for determining the probability that a given odd integer n is prime. The probability that n is composite is $$< 1/2^k \text{ if } a^{(x-1)/2} \equiv \left(\frac{a}{x}\right) (\bmod x)$$

for all of k random values of a<x, where $$\left(\frac{a}{x}\right)$$

is the Jacobi symbol of a mod x.

This "Solovay-Strassen" test can provide an efficient means for determining the probability that each of p and q are primes, where n=p.q, by submitting p and q to the test in turn. However, this requires p and q to be disclosed to the person verifying that n is product of two, only, primes.

To better understand the operation of the methods disclosed herein, the following terminology is used.

Let P be a positive integer. $Z_P^*$ denotes the multiplicative group of elements mod P. For $a \in Z_P^*$, $Ord_P(a)$ denote the order of a mod P.

Let a and b be integers. a|b denotes a dividing b; (a, b) denotes the greatest common divisor of a and b;

$$\left(\frac{a}{b}\right)$$

denotes the Jacobi symbol of a mod b; l(a) denotes the size of a, which is the number of the bits in the binary representation of a.

Let x be a real number. $\lfloor x \rfloor$ denotes the integer part of x (thus $l(a)=\lfloor \log_2(a) \rfloor +1$); |x| denotes the absolute value of x.

Let S be a set. #S denotes the cardinality of S.

Finally, Pr[E] denotes the probability for event E to occur.

The present applicant has determined that a Monte-Carlo test of the primality of a both of positive integers p and q, where n=p.q can comprise the following steps:

a) find a prime number P such that n|(P−1);
b) select any positive integer f such that A≠B, A≠1, B≠1 where
   $A=g^P \bmod P$,
   $B=g^q \bmod P$, and
   $g=f^{(P-1)/n} \bmod P$;
then repeatedly:
c) choose a random $h \in Z_n^*$ and $$\left(\frac{h}{n}\right) = -1;$$

d) choose random positive integers u, v;
e) calculate, modP;
   $H_U = B^{(h^u \bmod n)}$;
   $H_V = A^{(h^v \bmod n)}$;
   r=u+(p−1)/2;
   s=v+(q−1)/2;
f) determine whether, modP,
   $B^{(h^r \bmod n)} = H_U^{\pm 1}$; and
   $A^{(h^s \bmod n)} = H_U^{\mp 1}$.

It can be seen that the results of a Solovay-Strassen primality test are obtained on both p and q by steps f) of this method. Furthermore, the applicant has determined that the difficulty of finding p and q from knowledge of n, A and B of this test is at least as difficult as solving the decision problem on the membership of the Diffe-Hellman quadruples generated by g. (This is assumes that factorization of n and computing discrete logarithms to the base g are infeasible). Thus, if a verifier could be convinced that a prover has provided values for step f) which are properly related to p, q and the value of h (supplied by the verifier), the verifier would equally be confident of the Solovay-Strassen primality test using those values provide.

The present invention is as claimed in the claims.

SUMMARY OF THE INVENTION

The present invention, in a first aspect, provides a method of exchanging digital public-key verification data whereby a first party enables a second party to obtain probabilistic evidence that a given public-key number n is the product of exactly two odd primes p and q, not known to the second party, whose bit lengths (l(p), l(q)) differ by not more than d bits. The method including the following steps, all operations being to mod P unless specified mod n, the method being halted should any check fail. Initial parameters are established by:

a) said first party provides to said second party a number P such that P is a prime number and n|(P−1);
b) said second party provides to said first party a number g where $g=f^{(P-1)/n} \bmod P$, f<P;
c) said first party provides to said second party numbers A and B, where $A=g^p \bmod P$ and $B=g^q \bmod P$.

Thereafter:
d) said second party checks that A≠B, A≠1 and B≠1; whereupon the following steps are repeated up to k times;
e) said second party selects a random number $h \in Z_n^*$ such that $$\left(\frac{h}{n}\right) = -1$$

and provides the number h to the first party;
f) said first party checks that $$\left(\frac{h}{n}\right) = -1$$

and selects two random numbers u and v such that l(u)=l((p−1)/2), l(v)=l((q−1)/2) and provides to said second party the values $U=g^{2u}$, $V=g^{2v}$, $H_U=B^{(h^u \bmod n)}$,
g) $H_V=A^{(h^v \bmod n)}$, and $H_{UV}=h^u h^v \bmod n$;
g) said second party sends a request to the first party that the first party provides to the second party values r and s, which the second party randomly specifies should be either:
   (1) r=u and s=v; or
   (2) r=u+(p−1)/2, s=v+(q−1)/2
h) said first party provides the requested values r and s to the second party,
i) if the second party requested r=u and s=v, the second party determines whether:
   (1) $l(r) \leq \lfloor l(n)/2 \rfloor +d$, $l(s) \leq \lfloor l(n)/2 \rfloor +d$,
   (2) $g^{2r+1}=Ug$, $g^{2s+1}=Vg$,
   (3) $B^{(h^r \bmod n)}=H_U$, $A^{(h^s \bmod n)}=H_V$, and
   (4) $h^r h^s \equiv H_{UV} \pmod{n}$;

thereby verifying the values provided by the first party to the second party are as were required by steps a) to f); or, if the second party requested r=u+(p−1)/2, s=v+(q−1)/2, the second party determines whether:
   (1) $l(r) \leq \lfloor l(n)/2 \rfloor +d$, $l(s) \leq \lfloor l(n)/2 \rfloor +d$,
   (2) $g^{2r+1}=UA$, $g^{2s+1}=VB$,
   (3) $B^{(h^r \bmod n)}=H_U^{\pm 1}$, $A^{(h^s \bmod n)}=H_V^{\mp 1}$ (± and ∓ meaning the two exponents are of opposite sign), and
   (4) $h^r h^s \equiv H_{UV} h^{(n-1)/2} \pmod{n}$, thereby obtaining said probabilistic evidence on whether the given public-key number n is the product of exactly two odd primes p and q whose bit lengths (l(p), l(q)) differ by not more than d bits.

The cost of a proof amounts to $12k\log_2 n$ multiplications of integers of size of n where k is the number of the iterations in the proof and relates to an error probability bounded by $\max(\frac{1}{2}^k, 24/n^{1/4})$. To achieve cost and error similar to these, previous techniques require two additional conditions: (1) n is a Blum integer, and (2) a mutually trusted $k\log_2 n$-bit long random source is accessible by the proving/verification participants. In failure of (1), k must be increased substantially in order to keep error probability comparably small (e.g., k should be increased to 3000 for an error probability to remain at the level of $\frac{1}{2}^{60}$).

The present invention, in further aspects, encompasses computing entities and a communications system, a system of co-operating computing entities all for carrying out this protocol and a computer storage medium on which is stored instructions to enable general purpose computers to carry out the protocol.

BRIEF DESCRIPTION OF THE DRAWINGS

For a better understanding of the invention and to show how the same may be carried into effect, there will now be described, by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the applicant for carrying out the invention. In the following description numerous specific details are set forth in order to provide a thorough understanding of the present invention. It will be apparent however, to one skilled in the art, that the present invention may be practiced without limitation to these specific details. In other instances, well-known methods and structures have not been described in detail so as not to unnecessarily obscure the present invention.

There will now be described with reference to FIGS. 1 to 4 herein a method and apparatus by which private components p,q of a public-key n may be verified according to a first specific implementation of the present invention.

Figure 1:
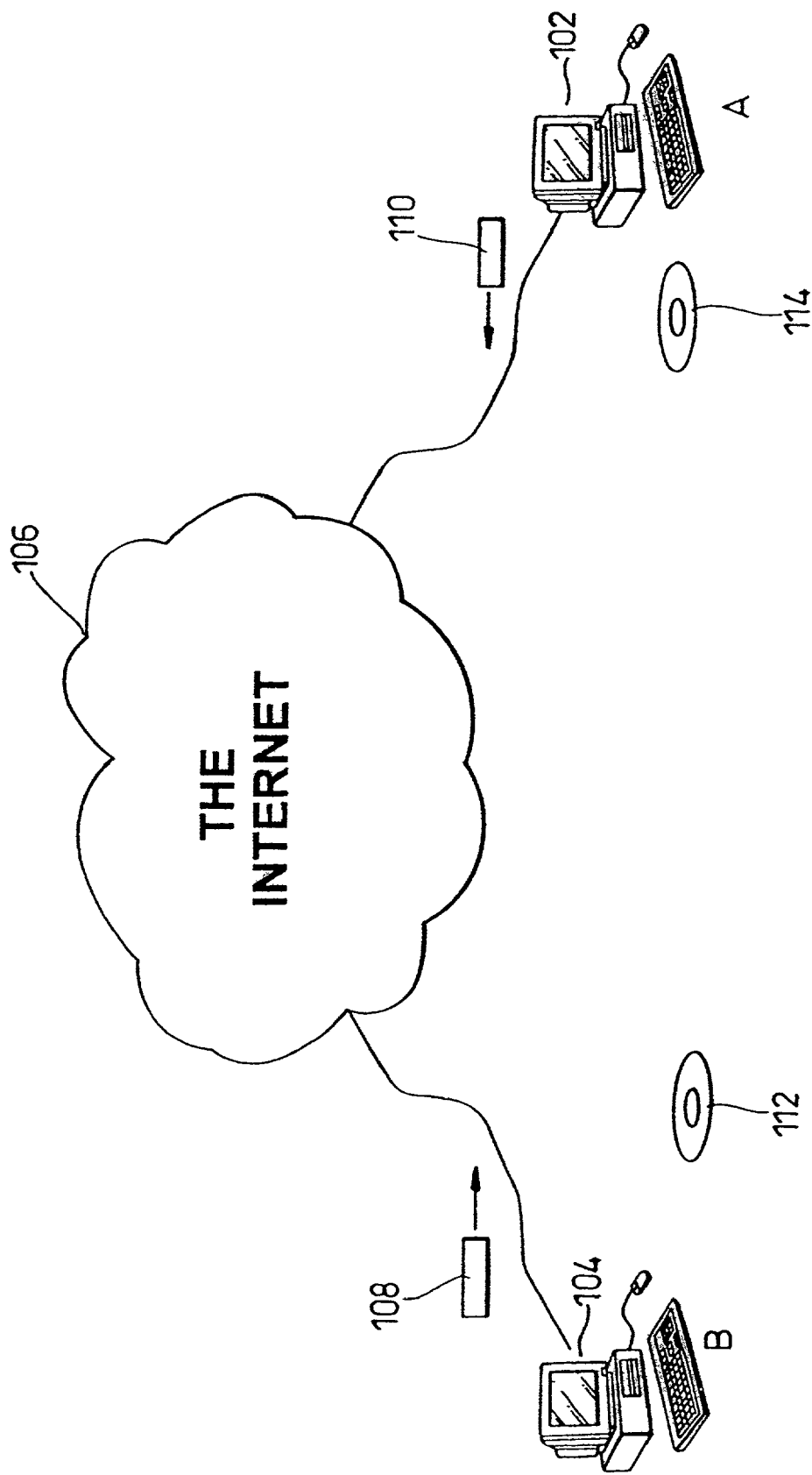
FIG. 1 illustrates schematically transmission of encrypted data from a first to second computing entity.

Referring to FIG. 1, there is illustrated schematically a pair of computing entities 102,104 configured for communicating electronic data with each other over a communications network, in this case the internet 106, by communicating data 108,110 to each other via the internet 106 in well known manner. Illustrated in FIG. 1 is first computing entity 102, herein after referred to as entity A and a second computing entity 104 herein referred to as entity B. In the example illustrated in FIG. 1, the first and second computing entities 102,104 are geographically remote from each other and whilst in the best mode herein, the communications network comprises the known internet 106, in other embodiments and implementations of the present invention the communications network could comprise any suitable means of transmitting digitized data between the computing entities. For example, a known Ethernet network, local area network, wide area network, virtual private circuit or public telecommunications network may form the basis of a communications medium between the computing entities 102, 104.

The computing entities 102 and 104 have been programmed by storing on memory programs read from computer program storage media 112,114, for example, a CD-ROM.

Figure 2:
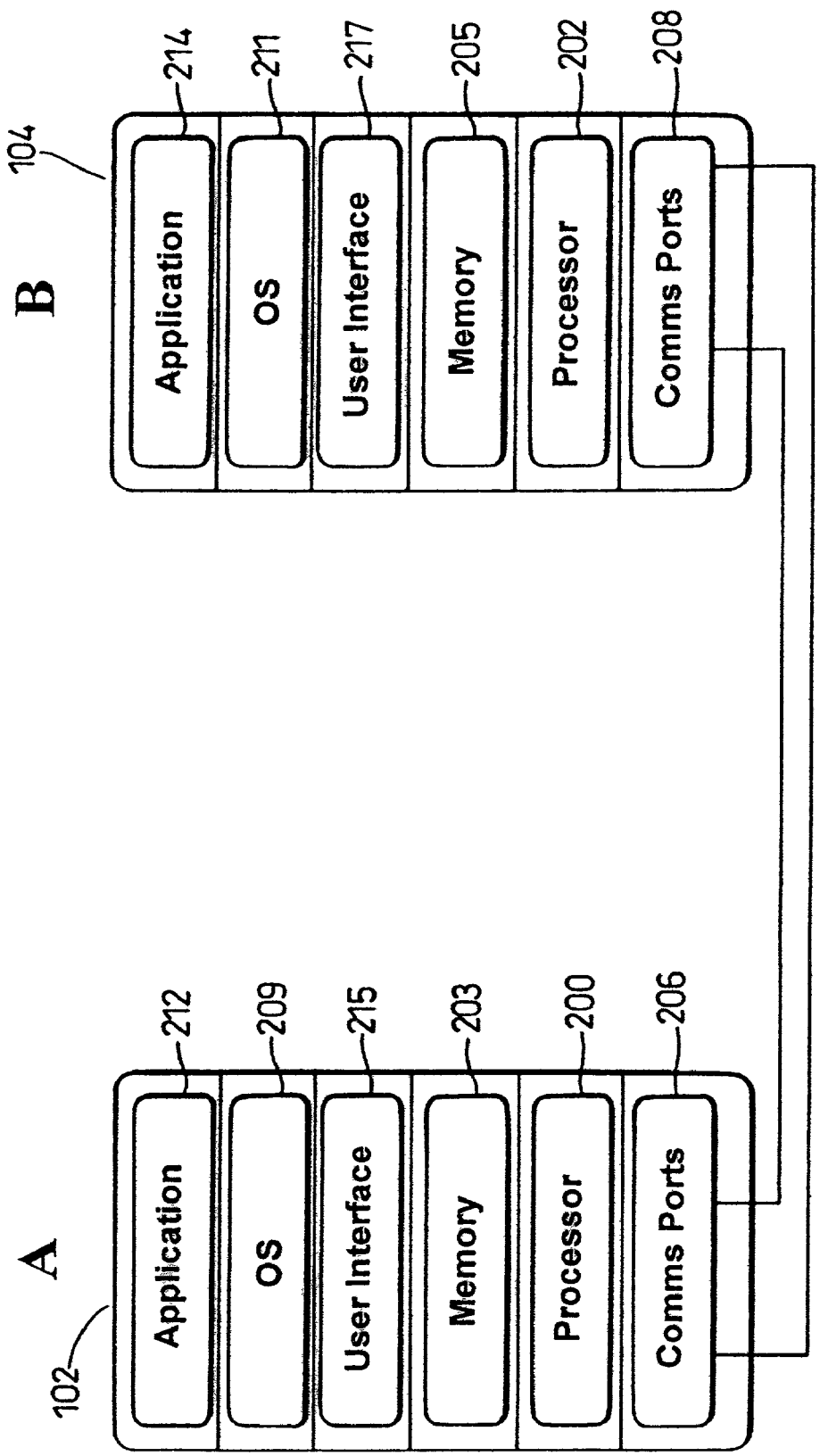
FIG. 2 illustrates schematically physical and logical resources of the computing entities illustrated in FIG. 1.

Referring now to FIG. 2, there is illustrated schematically physical resources and logical resources of the computing entities A and B. Each computing entity comprises at least one data processing means 200,202, a memory area 203,205, a communications port 206,208, for communicating with other computing entities. There is an operating system 209,211, for example a known Unix operating system. One or more applications programs 212, 214 are configured for operating for receiving, transmitting and performing data processing on electronic data received from other computing entities, and transmitted to other computer entities in accordance with specific methods of the present invention. Optionally there is a user interface 215,217 which may comprise a visual display device, a pointing device, e.g. a mouse or track-ball device, a keypad, and a printer.

Under control of the respective application program 212, 214, each of the computing entities 102, 104 is configured to operate according to a first specific method of the present invention.

Figure 3:
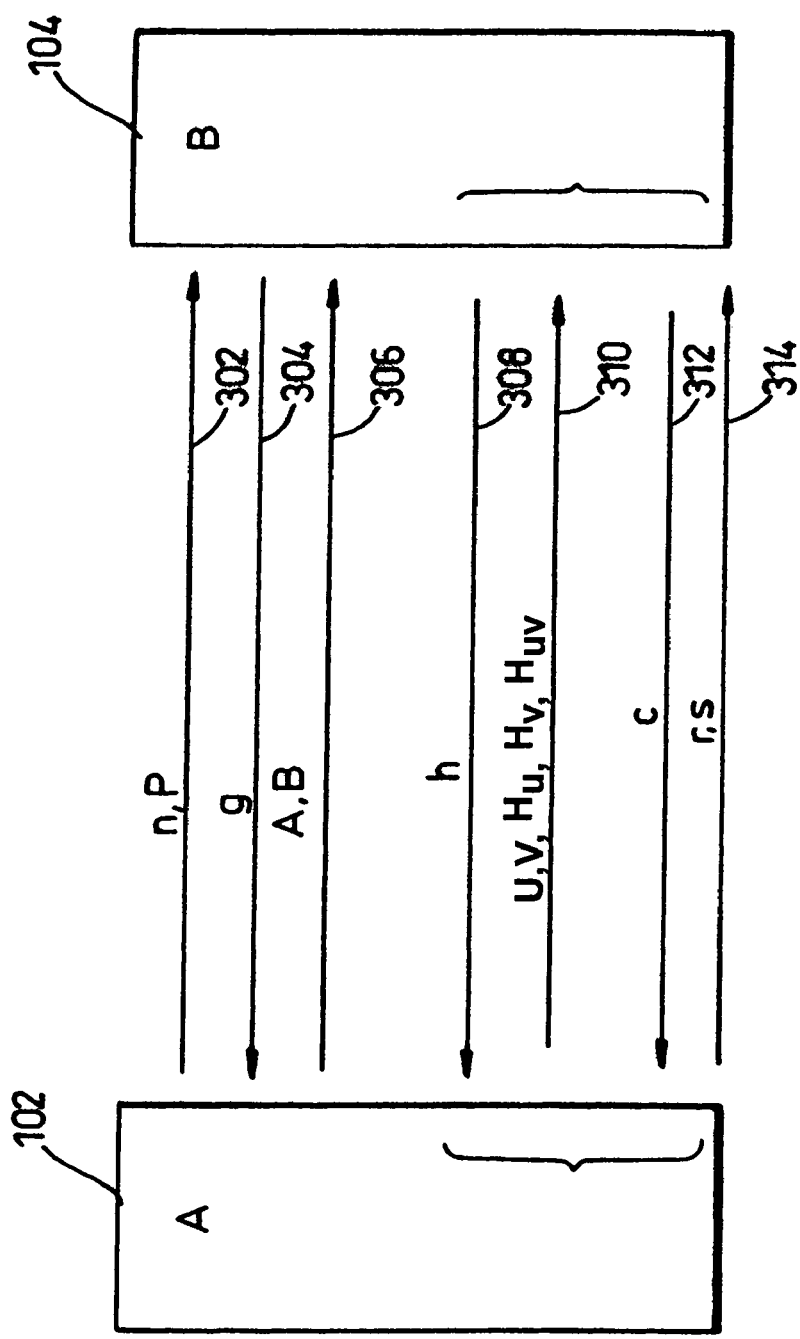
FIG. 3 illustrates schematically data communications between the computing entities of FIGS. 1 and 2.

Referring to FIG. 3 herein, there is illustrated schematically data communications passed between the first and second computing entities to effect verification by B of A's private components of a public-key according to the first specific implementation of the present invention.

Applications programs 212,214 operate a set of algorithms that effect implementation of the verification protocol. The precise implementation of the algorithms is preferably made in a conventional prior art programming language, for example the language C, or C++ using conventional programming techniques which are known to those skilled in the art. For a better understanding of the implementation of the algorithms, the following presents a model, notation and explanation of the verification protocol. It will be understood by those skilled in the art that the algorithmic steps are used to control the logical and physical resources of the computing entities by being programmed into the applications in a conventional programming language.

Figure 4A:
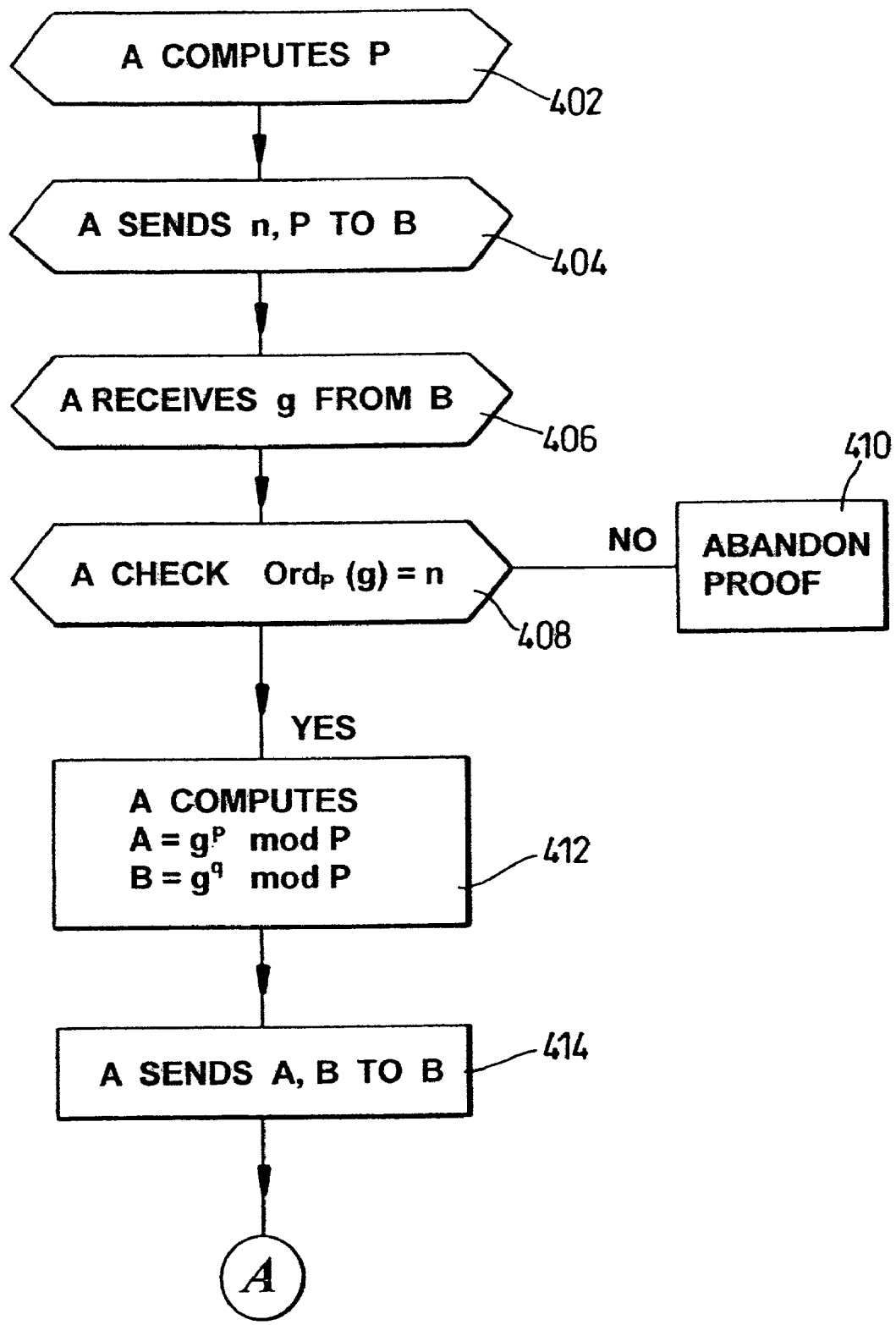
FIGS. 4A to 4C illustrates schematically process steps carried out by the one of the computing entities of FIGS. 1 and 2.
Figure 4B:
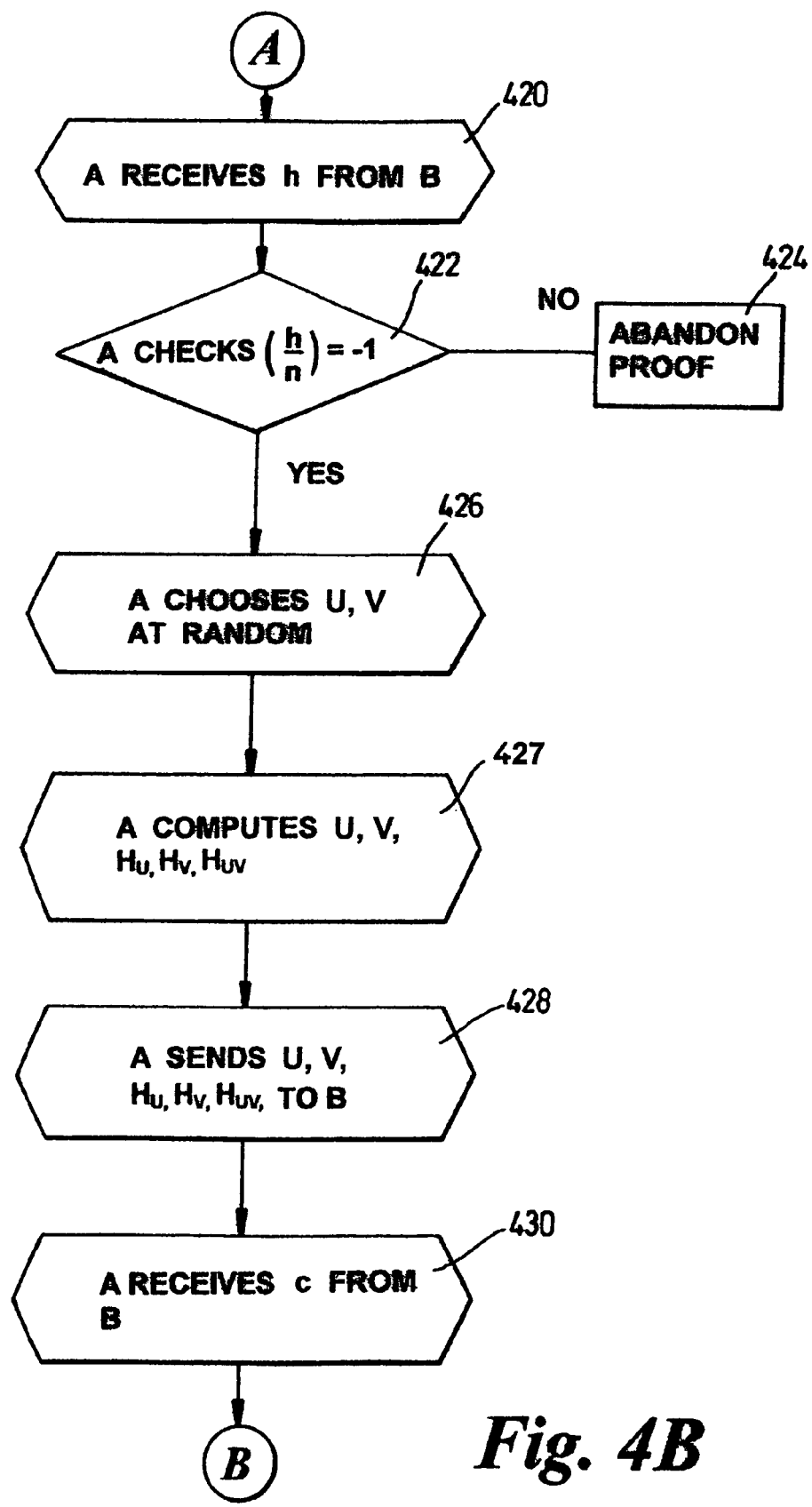
Figure 4C:
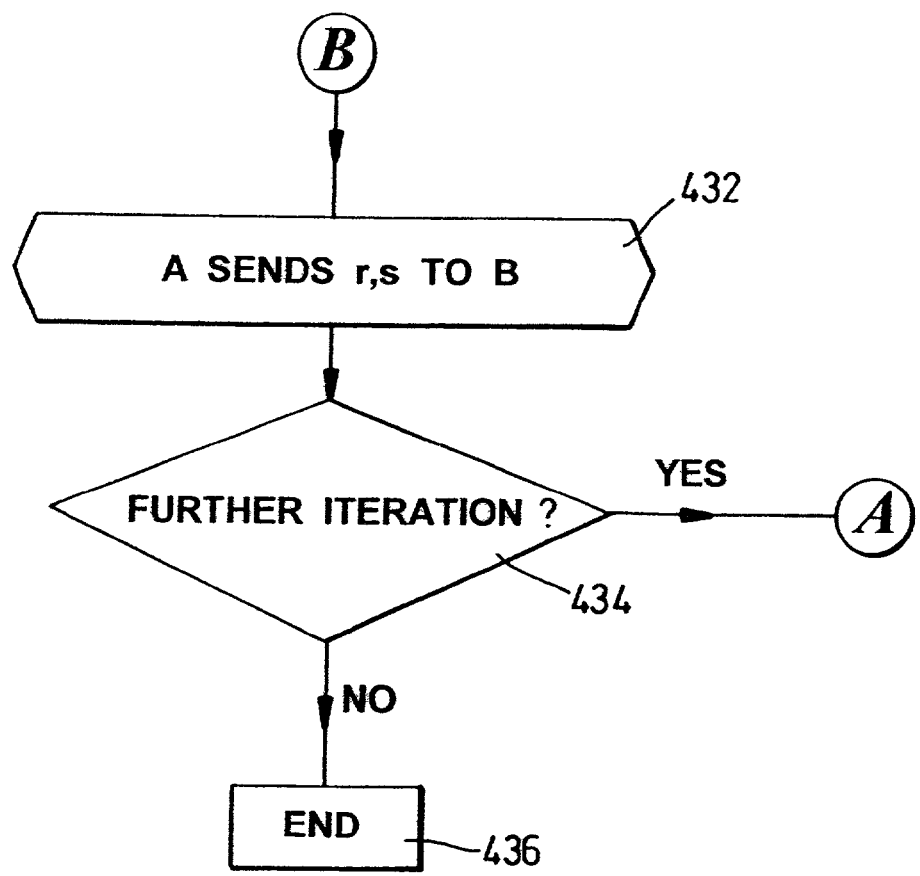
Figure 5A:
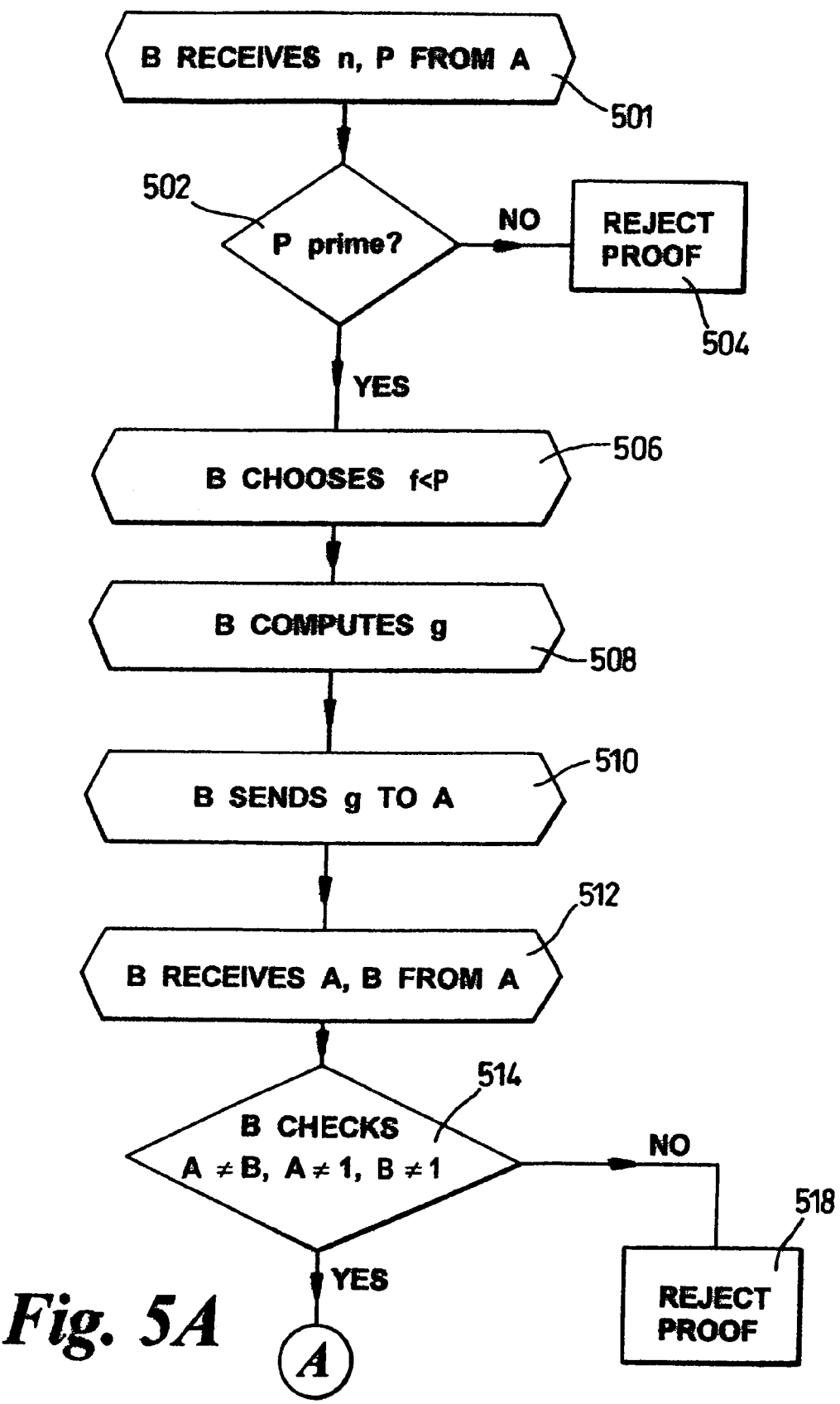
FIGS. 5A to 5C illustrates schematically process steps carried out by the other of the computing entities of FIGS. 1 and 2.
Figure 5B:
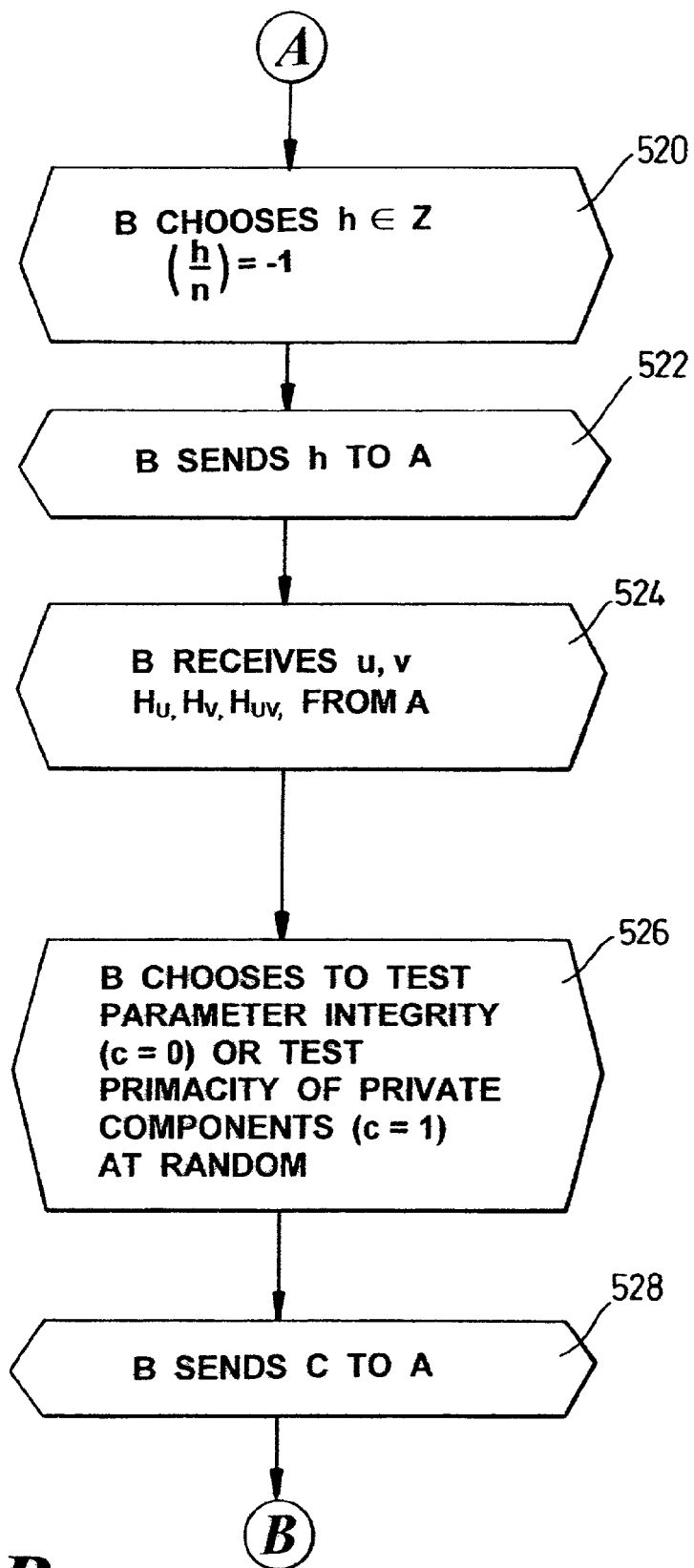
Figure 5C:
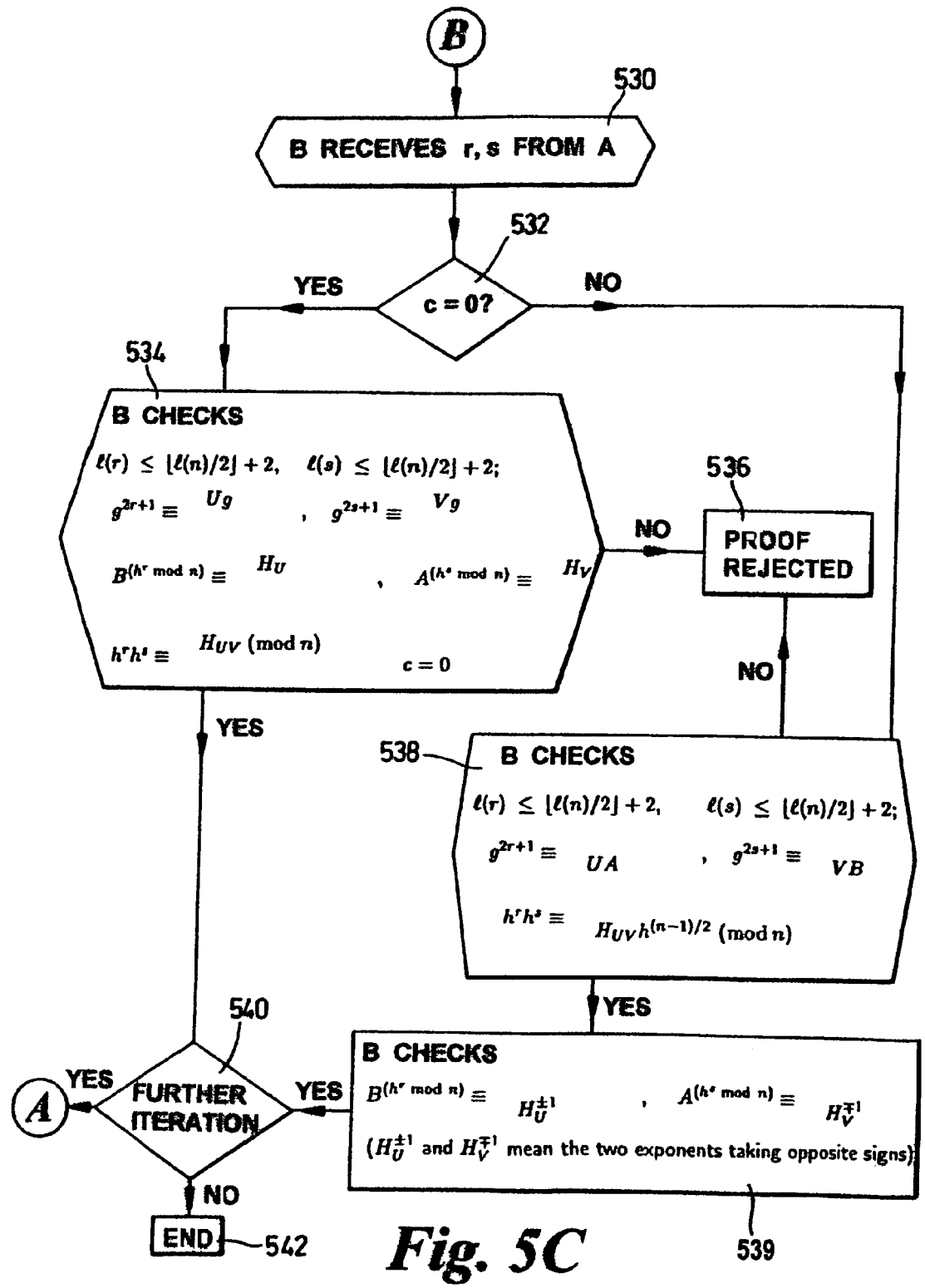

Referring now to FIGS. 3, 4 and 5, there will now be described the operation of two computing entities commonly referred to Alice and Bob which will be adopted here. The computing entity 102 and computing entity 104 by following the steps of FIGS. 4 and 5, respectively, exchanging signals representative of various data values as shown in Figure.

First, the computing entities agree on a set of parameters as follows, where Alice 102 is the prover and Bob 104 is the verifier. Alice has constructed n=pq such that p and q are distinct odd primes with $|l(p)-l(q)| \leq d$ (i.e., the lengths of the two primes differ by at most d bits). The length of n is generally at least 512 to meet common security standards. d is preferably no greater than 2 but can be larger. The disadvantage of a larger d is that as d increases it will reach a threshold where the probability of p and q are primes when the test of the present invention is passed becomes dependent on n not k.

A proof will be abandoned on Alice's instigation if any check she (i.e., the computing entity A) performs fails and will be rejected by Bob if any check he (ie the computing entity B) performs fails.

First, Alice shall help Bob to set up a multiplicative group of order n. For her part, Alice only needs to generate a prime P with n|(P−1). This prime can be constructed by testing the primality of P=2a n+1 for a=1,2, . . . , until P is found to be prime. By the prime number theorem (general form due to Dirichlet, see e.g., p. 28 of [E. Kranakis. *Primality and Cryptography*, Wiley-Teubner Series in Computer Science, John Wiley & Sons, 1986]), for fixed n with P=2a n+1≦N, there are roughly $$\pi_n(N) = \frac{2a}{\ln(2an+1)}$$

Such P's which are under N and are primes. Note that $N \leq 2a$ $n+1$ and $n > \phi(2n)$. So $$\pi_n(N) \approx \frac{1}{\phi(2n)} \cdot \frac{N}{\ln N}$$

Since Alice's primality test procedure uses $a=1,2,\ldots$, the above inequality indicates a non-trivial probability for two primes to show up upon a reaching $\ln(2n \ln n)$. So one can be sure that a is small (likely to be bounded by $\ln(2n \ln n)$). It will be computationally easy for Alice to find the prime P (step 402). Once P is found to be prime, Alice sends the numbers n and P to Bob (step 404, data 302).

Upon receipt of n and P (step 501), Bob tests the primality of P (step 502). If P is not a prime the proof is rejected (step 504). Upon passing of the test, Bob chooses a random element $f < P$ (step 506), and sets $$g = f^{(P-1)/n} \bmod P \text{ (step 508)}$$

Bob then sends g to Alice (steps 510, data 304).

Upon receipt of g (step 406), Alice shall check $\mathrm{Ord}_P(g) = n$ (step 408). If this does not hold, Alice may not be able to pass a proof later and so abandons the proof (step 410).

Above we have reasoned that $2a = (P-1)/n$ is small ($<< n$). Thus, for $n=pq$, there can only be a few factors of $P-1$ which are less than n and are fully known to Alice. So it will be computationally easy for Alice to check $\mathrm{Ord}_P(g) = n$. Upon passing this simple checking, Alice shall set $$A = g^p \bmod P, \; B = g^q \bmod P \text{ (step 412)}$$

Alice then sends the pair (A, B) to Bob (step 414, data 306).

Upon receipt of (A, B)(step 512), Bob shall check the following:

$A \neq B$, $A \neq 1$, $B \neq 1$ (step 514).

If these checks are passed, the system parameters have been properly set up and moves on to step 520. If not, Bob rejects the proof (step 518).

For clarity, we shall omit the trailing mod P operation in the following protocol specification which, for reference will be called Two_Prime_Product (n, g, A, B, P) The following steps are repeated k times 1. Bob picks $h \in Z_n^*$ at random with $$\left(\frac{h}{n}\right) = -1$$

(step 520) and sends it to Alice (steps 522, data 308).

2. Alice receives h (step 420) and checks $$\left(\frac{h}{n}\right) = -1$$

(step 422) and abandons the proof (step 424) if the check fails. If the check passes Alice, picks u, v at random (step 426) such that $l(u) = l((p-1)/2)$
$l(v) = l((q-1)/2)$ and sets $U = g^{2u}$, $V = g^{2v}$, $H_U = B^{(h^u \bmod n)}$, $H_V = A^{(h^v \bmod n)}$, $H_{UV} = h^u h^v$ mod n (step 427);

Alice sends to Bob: U, V, $H_u$, $H_v$, $H_{uv}$ (steps 428, data 310).

3. Bob receives these values from A (step 524) and picks a challenge $c \in \{0,1\}$ at random (step 526) and sends it to Alice (steps 528, data 312).

4. Alice receives the challenge (step 430) and sends Bob the responses $r = u + c(p-1)/2$, $s = v + c(q-1)/2$ (step 432, data 314).

5. Bob receives r and s from A (step 530) checks all of the following (c=0);

5.1 $l(r) \leq \lfloor l(n)/2 \rfloor + 2$, $l(s) \leq \lfloor l(n)/2 \rfloor + 2$
5.2 $g^{2r+1} = Ug$, $g^{2s+1} = Vg$
5.3 $B^{(h^r \bmod n)} = H_U$, $A^{(h^s \bmod n)} = H_V$
5.4 $h^r h^s = H_{UV} \pmod n$ 6. Bob checks: (c=1)
6.1 $l(r) \leq \lfloor l(n)/2 \rfloor + 2$, $l(s) \leq \lfloor l(n)/2 \rfloor + 2$
6.2 $g^{2r+1} = UA$, $g^{2s+1} = VB$
6.3 $B^{(h^r \bmod n)} = H_U^{\pm 1}$, $A^{(h^s \bmod n)} = H_V^{\mp 1}$ ($H_U^{\pm 1}$ and $H_V^{\mp 1}$ means the exponents take opposite signs)
6.4 $h^r h^s = H_{UV} h^{(n-1)/2} \pmod n$ at steps 534 or 536, for c=0, c=1, respectively.

If c=0 and any of the checks of step 534 fails then Bob rejects the proof (step 536). Similarly, if c=1 and if the checks of step 538 fail, then Bob rejects the proof (step 536).

If the checks at step 534 all pass, Bob decides if a primality check for a further value of n is required (step 540). If "Yes" Bob chooses another h(step 520) and another iteration is carried out; if "No" the protocol is ended (step 542).

If the checks at step 538 all pass, Bob checks for Monte-Carlo evidence at step 539 and then determines if another iteration is to be carried out (step 540).

Alice then determines if Bob wishes to go through a further iteration (step 434). If "Yes" it returns to step 420, if "No" the protocol ends.

We shall see below that the two congruences checked in step 6.3 actually evaluate the Jacobi (Legendre) symbols $$\left(\frac{h}{p}\right) \text{ and } \left(\frac{h}{q}\right).$$

Using challenges of the negative Jacobi symbol has the virture of not disclosing the quadratic residue information of the challenges. In contrast, many square-root displaying protocols (e.g., [R. Gennaro, D. Miccianicio and T. Rabin. An efficient non-interactive statistical zero-knowledge proof system for quasi-safe prime products, In 5gh ACM Conference on Computer and Communications Security, October 1998, J. van de Graaf and R. Peralta. A simple and secure way to show the validity of your public-key, Advances in Cryptology—Proceedings of CRYPTO 87 (E. Pomerance, ed.), Lecture Notes in Computer Science, Springer-Verlag, 293 (1988), pp. 128–134]) disclose such information.

The protocol allows for the two factors to have size differences satisfying $|l(p)-l(q)| \leq d$. Larger size differences, if desirable, can be accommodated by adjusting the inequalities in steps 5.1 and 6.1.

We analyze the security the protocol, which consists of the properties of completeness, soundness, and privacy.

Completeness

Theorem 1 If Alice follows the specification of Two_Prime_Product, a proof will be accepted.

Proof We show that Bob will be satisfied by the checks performed in protocol step 5.1 through step 5.4.

First, we show the inequalities in 5.1. Alice has set p and q such that pq=n $$-2 \leq l(p) - l(q) \leq 2. \quad (1)$$

Obviously $$l(n) \leq l(p) + l(q) \leq l(n) + 1. \quad (2)$$

Adding (1) to (2) yields $$2l(p) \leq l(n) + 3,$$

or $$l(p) \leq \lfloor l(n) \rfloor / 2 + 2. \quad (3)$$

Alice has chosen $l(u)=l((p-1)/2)$. With p odd, $(p-1)/2$ is a whole number and $l((p-1)/2)=l(p)-1$. So when c=0

$$l(r) = l(u) = l((p-1)/2) = l(p) - 1,$$

and When c=1

$$l(r) = l(u + (p-1)/2) \leq l((p-1)/2) + 1 = l(p).$$

So for both cases, (3) will imply $$l(r) \leq \lfloor l(n) \rfloor / 2 + 2.$$

Analogously we can show $$l(s) \leq \lfloor l(n) \rfloor / 2 + 2.$$

In the following, we shall only examine the cases under c=1, since c=0 will render the congruences in 5.2 through 5.4 to hold trivially.

In 5.2, noting that $g^P \equiv A \pmod{P}$ and the structures of U and r, it is easy to see that the first congruence will hold. The second congruence holds similarly.

To see that the congruences in 5.3 will hold, observe $$B^{(h^{(p-1)/2} \bmod n)} \equiv B^{(h^{(p-1)/2} \bmod p)} \equiv B^{\left(\frac{h}{p}\right)} \pmod{P}. \quad (4)$$

The first congruence in (4) is due to $\mathrm{Ord}_P(B) = p | n$. Then, since p is prime, the second congruence in (4) follows from Euler's criterion. Therefore, the first congruence in 5.3 (for c=1) is:

$$B^{(h^r \bmod n)} \equiv B^{(h^{u+(p-1)/2} \bmod n)}$$
$$\equiv \left(B^{h^{(p-1)/2} \bmod n}\right)^{(h^u \bmod n)}$$
$$\equiv \left(B^{h^{(p-1)/2} \bmod p}\right)^{(h^u \bmod n)}$$
$$\equiv \left(B^{\left(\frac{h}{p}\right)}\right)^{(h^u \bmod n)}$$
$$\equiv \left(B^{(h^u \bmod n)}\right)^{\left(\frac{h}{p}\right)}$$
$$\equiv H_U^{\left(\frac{h}{p}\right)} \pmod{P},$$

while the second congruence in 5.3 (for c=1) is, analogously, $$A^{(H^2 \bmod n)} \equiv H_V^{\left(\frac{h}{q}\right)} \pmod{P}.$$

The exponents of the both right-hand sides must take opposite signs since Jacobi symbols only take values ±1 and h has been chosen to satisfy $$-1 = \left(\frac{h}{n}\right) = \left(\frac{h}{p}\right)\left(\frac{h}{q}\right).$$

Therefore the congruences in 5.3 will hold.

Finally, any $h \in Z_n^*$ will satisfy $$h^{p+q} \equiv h^{n+1} \pmod{n}.$$

With $(p-1)/2$, $(q-1)/2$ and $(n-1)/2$ being whole numbers, it is easy to rewrite the above into $$h^{[(p-1)/2 + (q-1)/2]} \equiv h^{(n-1)/2} \pmod{n}.$$

Therefore the congruence in 5.4 will hold.

Soundness

We now show that protocol Two_Prime_Product provides a Monte-Carlo method for testing the primality of the orders of A and B. We firstly note that all the numbers and variables to appear in this section are non-negative integers. In particular, $\log_g(A)$ and $\log_g(B)$ denote some positive integers p and q less than $\mathrm{Ord}_P(g)$ satisfying $A \equiv g^p \pmod{P}$ and $B \equiv g^q \pmod{P}$.

Lemma 1 Without the knowledge of the factorization of n, the element g fixed by Bob satisfies $$Pr[\mathrm{Ord}_P(g) \text{ divides } x] = x/n,$$

for any x divides n.

Proof Without the knowledge of the factorization of n. Bob's procedure for fixing g is via $g = f^{(P-1)/n} \bmod P$ using f which is chosen at random from $Z_P^*$.

Then $g^n \equiv 1 \pmod{P}$ by Fermat's Theorem. In the cyclic group $Z_P^*$ there are exactly $n = \Sigma_{d|n} \phi(d)$ elements of orders dividing n. Only these elements can be the candidates for g. For the same reason, for any x|n|P−1, there are exactly $x = \Sigma_{d|x} \phi(d)$ elements in $Z_P^*$ of orders dividing x. The claimed probability is thus calculated as that of picking x objects from n.

Lemma 2 Denote $\mathrm{Ord}_P(B) = x$ and $\mathrm{Ord}_P(A) = y$. Upon acceptance of a proof on running Two_Prime_Product(n, g, A, B, P), Bob accepts that his random choice of h in the protocol run ((h, n)=1 and $$\left((h, n) = 1 \text{ and } \left(\frac{h}{n}\right) = -1\right)$$

satisfies $$\begin{cases} h^{[(\log_g(A)-1)/2]} \equiv \pm 1 \pmod{x} \\ h^{[(\log_g(B)-1)/2]} \equiv \mp 1 \pmod{y} \end{cases},$$

and the probability for failing this does not exceed $1/2^k$ where k is the number of iterations used in the protocol.

Proof The first congruence in 5.2 shows that Alice knows both $\log_g(U)$ (shown when c=0) and $\log_g(U\,A)=\log_g(U)+\log_g(A)$ (shown when c=1), and has added $\log_g(A)$ to the response whenever c=1 is the case. Suppose Alice does not know $\log_g(A)$. Then in each iteration she can only answer Bob's random challenge with at most $1/2$ chance of correctness. Thus, after having verified k times of correct responses to his random challenges, Bob should agree that the probability for Alice not having used $\log_g(A)$ in her response (when c=1) is at most $1/2^k$.

The first congruence in 5.3 further shows that $H_U$ is generated from B with the use of an exponent which is in turn generated from Bob's randomly chosen challenge h. Since (h, n)=1, ($h^r$ mod n, n)=1. Therefore $$Ord_P(H_U)=Ord_P(B)=x.$$

Clearly, the quantity $\log_g(A)$ in 2r+1 (when c=1) amounts to $(\log_g(A)-1)/2$ in r. Therefore the first congruence in 5.3 shows that for h satisfying (h, n)=1:

$$h^{[(\log_g(A)-1)/2]} \equiv \pm 1 \pmod{x}.$$

Analogously we can use the second congruence in 5.3 to establish that for the same h $$h^{[(\log_g(B)-1)/2]} \equiv \mp 1 \pmod{y}.$$

In the rest of this section we will continue denoting $$Ord_P(B)=x,\ Ord_P(A)=y.$$

Following the Solovay-Strassen primality test technique [17] we define the following set $$H_x=\{h\in Z_x^* \mid (h,x)=1,\ h^a \equiv \pm 1 \pmod{x},\ a\ \text{constant}\}. \quad (5)$$

Clearly, this set is a subgroup of $Z_x^*$. It is a variation of its counterpart used in the Solovay-Strassen primality test technique. There, $H_x$ is defined such that the exponent a is (x−1)/2. In our "test in the dark" method., the verifier Bob is not given the modulus x, let alone does he know the relation between the exponent and the modulus. All the information Bob has is that the modulus is a factor of n, and that the exponent is a constant. (The result of Lemma 2 stipulates the constant be $(\log_g(A)-1)/2$.)

Lemma 3 Let x, y and h be as in Lemma 2. Bob accepts that x and y are prime powers. The probability for failing this does not exceed $1/2^k$.

Proof We prove the lemma by estimating the probability for x not being a prime power. A prime power can be written as pr with p prime and r≧1. Suppose x is not a prime power. Then let x=ξn with ξ>1, n>1 and (ξ, n)=1.

Obviously, either $H_x$ is a proper subgroup of $Z_x^*$, or $H_x=Z_x^*$.

In the first case, $\#H_x$ is at most half of $\#Z_x^*$ (since the former must divide the latter), and thereby the probability for each h randomly picked from $Z_x^*$ to fall in $H_x$ cannot exceed $1/2$, which amounts to $1/2^k$ to bound the probability for k such h's to be so.

Now we consider $H_x=Z_x^*$. We claim that $H_x$ will only contain elements satisfying $$h^a \equiv 1 \pmod{x}, \quad (6)$$

where a is the constant in (5). Suppose $H_x=Z_x^*$ while (6) is not true for some element in $H_x$. Let h be such an element. So $h^a \equiv -1 \pmod{x}$. Since ξ and n are relatively prime, by the Chinese remainder theorem, the system f≡1 (mod ξ), f≡h (mod n) has a solution f∈$Z_x^*$. Obviously, $$f^a \equiv 1 \pmod{\xi},\ f^a \equiv -1 \pmod{n},$$

yielding $$f^a \not\equiv \pm 1 \pmod{x}.$$

So f∈$Z_x^*$\$H_x$, contradiction to $H_x=Z_x^*$.

So now we must consider $H_x=Z_x^*$ with all elements in $H_x$ satisfying (6). This implies that for k randomly chosen h's with (h mod y, y)=1, $h^\beta \equiv -1 \pmod{y}$ where $\beta=(\log_g(B)-1)/2$. Let z be a prime factor of y. Then we will also have ($h^\beta$ mod z, z)=1 and $$h^\beta \equiv -1 \pmod{z}. \quad (7)$$

Since z is prime, by Fermat's Theorem we know z−1|2β, i.e., β is a multiple of (z−1)/2. In $Z_z^*$ there are exactly half the elements which are quadratic non-residues satisfying (7) (none of other elements can satisfy it). So the probability for this congruence to hold for k randomly chosen h's cannot exceed $1/2^k$. This value must also bound the probability for x not being a prime power.

By symmetry, y is also a prime power.

Lemma 4 Under the hypotheses of Lemma 3, (x, y)=1, and the probability for failing this does not exceed $1/2^k$.

Proof Since x and y are both prime powers, if (x, y)>1, we can assume without loss of generality that $x=p^r|y$. Using the result of Lemma 2 we can derive $$\mp 1 \equiv h^\beta \pmod{y} \equiv h^\beta \pmod{x}.$$

At the same time we have $$h^a \equiv \pm 1 \pmod{x}.$$

Thus, $$h^{|a-\beta|} \equiv -1 \pmod{x} \equiv -1 \pmod{p},$$

for all k instances of randomly-picked h with (h, p)=1. Since p is prime, the above is only possible if p−1 divides 2|a−β| but not divides |a−β|. So |a−β| is an odd multiple of (p−1)/2 which implies $$h^{(p-1)/2} \equiv -1 \pmod{p} \quad (8)$$

for all such h mod p. There are only half the elements in $Z_p^*$ which are quadratic non-residues satisfying (8). Therefore the probability for (8) to hold for k time, i.e., for k random h's with h mod p being quadratic non-residues will not exceed $1/2^k$. Since the congruence in (8) is derived from the assumption (x, y)>1, the value $1/2^k$ also bounds the probability for (x, y)>1.

Lemma 5 Under the hypotheses of Lemma 2, there exists integers a and b satisfying $$\log_g(A)=ax \leq 8n^{1/2},\ \log_g(B)=by \leq 8n^{1/2}.$$

Proof From the proof of Lemma 2 we know that A is generated from g. So its order y can only be reduced from $Ord_P(g)$ and thereby y|$Ord_P(g)$. We also know $$0 = \log_g(1) \equiv \log_g(A^y) \equiv y \log_g(A) \pmod{Ord_P(g)}.$$

This means $$Ord_P(g) | y \log_g(A). \qquad (9)$$

By symmetry, $x | Ord_P(g) | x \log_g(B)$. Then $xy | Ord_P(g)$ since $(x, y)=1$ (Lemma 4). Combining this with (9), we have $x | \log_g(A)$. By symmetry we can also derive $$Ord_P(g) | x \log_g(B), \qquad (10)$$

and $y | \log_g(B)$. So we can write $$\log_g(A) = ax, \log_g(B) = by,$$

for some a and b.

In protocol step 5.1. Bob has checked that in both challenge cases, the responses r and s satisfy $$l(r) \leq \lfloor l(n)/2 \rfloor + 2.$$

Since when the challenge is c=1, $l(\log_g(A)) \leq l(2r+1) = l(r)+1$, $$l(\log_g(A)) \leq \lfloor l(n)/2 \rfloor + 3.$$

This implies $$\log_g(A) \leq 2^{\lfloor l(n)/2 \rfloor + 3} \leq 8n^{1/2}.$$

By symmetry, $by = \log_g(B) \leq 8n^{1/2}$.

Now we can prove the soundness of our protocol.

Theorem 2 Upon acceptance of a proof Two_Prime_Product(n, g, A, B, P) with $n \geq 24^4$ and odd, Bob accepts that $\log_g(A)$ and $\log_g(B)$ are distinct odd primes. The probability for failing this does not exceed $\max(\frac{1}{2}^k, 24/n^{1/4})$ where k is the number of iterations used in the proof.

Proof We know $x \neq y$ since they axe relatively prime to each other. Both are odd since both divide an odd number n. By symmetry; we only need to prove the case for $x = \log_g(A)$ to be a prime. We have already established $ax = \log_g(A)$ (Lemma 5) and $x = p^r$ with p being prime (Lemma 3). So to prove this theorem we need only to show $a = r = 1$. We shall establish the probability for Bob to accept the proof while assuming either $r > 1$, or $a > 1$. Using the method that we have used in the proof of Lemma 3, we shall reason that if any of these two cases is true, then either $H_x$ (defined in (5)) should be a proper subgroup of $Z_x^*$, which will render $\frac{1}{2}^k$ to bound the probability for Bob to accept a proof of k iterations, or another event of a negligibly small probability should has occurred.

First, consider the case of $r > 1$.

There exists $h \in Z_{p^r}^*$ of the full order $(p-1)p^{r-1}$. This element cannot be in $H_x$ since otherwise the first congruence established in Lemma 2 will imply $$h^{ap^r - 1} \equiv 1 \pmod{p^r},$$

which yields $$(p-1)p^{r-1} | ap^r - 1.$$

So there exists $\lambda$ satisfying $$ap^r - \lambda(p-1)p^{r-1} = 1.$$

This means $p^{r-1}$ is relatively prime to $p^r$, impossible with $r > 1$. So $H_x$ must be a proper subgroup of $Z_x^*$.

The remaining case is $a > 1$ and x prime.

There exists $h \in Z_x^*$ of full order $x-1$. If h is not in $H_x$ then $H_x$ is a proper subgroup and we have done. Now suppose $h \in H_x$. The first congruence in Lemma 2 implies $$h^{ax-1} \equiv 1 \pmod{x},$$

which further implies $x-1 | ax-1 = a(x-1) + a - 1$. So $x-1 | a-1$. This is only possible if $x \leq a$. From Lemma 5, $ax \leq 8n^{1/2}$. So $x^2 \leq ax \leq 8n^{1/2}$, or $x < 3n^{1/4}$. Lemma 5 also requires $\log_g(B) = by \leq 8n^{1/2}$. These yield $$x \log_g(B) = xby < 24n^{3/4}.$$

So, this case of $\log_g(A)$ requires $xby < 24n^{3/4}$. From (10), $Ord_P(g) | xby$. Also, $Ord_P(g) | n$. So $Ord_P(g) | (xby, n) \leq xby \leq n$ ($n \geq 24^4$). Now we can apply Lemma 1 and obtain $$Pr[Ord_P(g) \text{ divides } (xby, n) = (xby, n)/n \leq xby/n < 24/n^{1/4}.$$

We have shown that if x is not a prime, or $x \neq \log_g(A)$, then the probabilities for Bob to accept the proof are bounded by either $\frac{1}{2}^k$, or $24/n^{1/4}$, whichever is larger. The latter value bounds the probability for Bob to have chosen g of such a small order.

Remark In the proof of Theorem 2 and Lemma 3 we have used random elements in $Z_x^*$. We should point out that in the protocol Bob only picks h at random from $Z_n^*$, rather than from $Z_x^*$, since he does not know the factorization of n. Also h is chosen to have the negative Jacobi symbol mod n. However, the mapping from such h in $Z_n^*$, to h mod x in $Z_x^*$ is onto (the mapping is accomplished by the double exponentiations checked in protocol step 5.3) and thereby results in uniformly distributed elements in $Z_x^*$.

Theorem 3 Under the hypotheses of Theorem 2, $n = \log_g(A) \log_g(B)$, and the probability for failing this does not exceed $\max(\frac{1}{2}^k, 8/n^{1/4})$.

Proof In Theorem 2 we have proved $\log_g(A) \log_g(B) = xy = Ord_P(g) | n$ where x and y are distinct primes. Suppose $n = xyz$ for some integer z. We prove the theorem by estimating the probability for $z > 1$.

The congruence checked in protocol step 5.4 implies that each h that Bob chooses at random satisfies $$Ord_n(h) | n - x - y + 1 \qquad (11)$$

Define the following set as a subgroup of $Z_n^*$:

$$H = \{h \in Z_n^* | h^{(n-x-y+1)} \equiv 1 \pmod{n}\}.$$

Since x, y are distinct primes, there exists $h \in Z_n^*$, of order $\max(x-1, y-1)$. If $h \notin H$ then H is a proper subgroup of $Z_n^*$ and $\#H$ cannot exceed the half of $\#Z_n^*$. Thus, the probability for choosing k random elements from $Z_n^*$ which also fall in H (to pass the congruence in step 5.4) will not exceed $\frac{1}{2}^k$.

Now suppose $h \in H$. Without loss of generality, let $x-1 \geq y-1$. Then from (11) we can derive $$x-1 \equiv Ord_n(h) | z-1.$$

This is only possible if $x \leq z$. Given $y \leq 8n^{1/2}$, the maximum possible value for $Ord_P(g) = xy = n/z$ can only be resulted from the maximum possible value of $x = z$, which renders $$Ord_P(g) = xy \leq 8n^{3/4}.$$

Applying Lemma 1 we know that the probability for Bob having chosen g of such a small order does not exceed $8/n^{1/4}$.

Thus, we can use $\max(\frac{1}{2}^k, 8/n^{1/4})$ to bound the probability for $z > 1$.

To this end we know that the two primes factors of n have roughly equal size since $$\log_g(A) \leq 8n^{1/2}, \log_g(B) \leq 8n^{1/2}.$$

As a concluding remark for our soundness analysis, we emphasize the importance of verifying the congruences in the protocol step 5.3. Besides their roles in the soundness proof that we have seen, they also exclude x and y from being certain pseudo-primes such as Carmichael numbers (see e.g., p. 137 of [13]). Moreover, they prevent x and y from being methodically chosen in a cheating way that can pass a (flawed) protocol in [12] for proof of a required format for RSA moduli. (The required format is the same as what our protocol proves: n is the product of exactly two primes of roughly equal size.) That protocol first applies a square-root displaying protocol to prove that n is the product of two prime powers ([12] suggests to use the method of [9] for proof of Blum integers; we will discuss more on square-root displaying protocols in Section 4), and then verifies $$h^{x+y} \equiv h^{n+1} \pmod{n}$$

(equivalent to the congruence checked in our protocol step 5.4), plus checking the sizes of x and y. Below we reason that such verification does not suffice for proving the required format of n.

Let n=xy with x, y being odd. It is easy to see that, as long as $\lambda(n)$ (Carmichael function of n, which is the lowest order of all elements in $Z_n^*$) divides (x-1)(y-1)/2= (n-1)/2-[(x-1)+(y-1)]/2, the congruence above will always pass. Alice can thus cheat as follows. She sets $x=p^r$ with p prime and r>1 such that $y=2p^{r-1}+1$ is prime and $l(x) \approx l(y)$. There are sufficiently many primes p such that $2p^{r-1}+1$ is also prime. So it will be easy for Alice to find p and y to satisfy what is required. Clearly, n is the product of two prime powers, and will therefore pass a Blum integer proof based on displaying square roots of challenges. The size checking on x and y will pass too. Moreover, $$(x-1)(y-1)=(p^r-1)2p^{r-1}=(p-1)(\ldots)2p^{r-1},$$

and $$\lambda(n)=1cm(\phi(x), \phi(y))=1cm((p-1)p^{r-1}, 2p^{r-1})=(p-1)p^{r-1}.$$

So it always holds $$\lambda(n)|(x-1)(y-1)/2.$$

Consequently, verification using $h^{x+y} \equiv h^{n+1} \pmod{n}$ will pass for all $h \in Z_n^*$. But n is not the product of exactly two primes, and the sizes of its prime factors are not roughly equal ($l(p) \approx l(y)/r$).

Privacy

In addition to n Alice has also made available the following two constants:

$$(A, B) \equiv (g^p, g^q) \pmod{P}.$$

Were these two constants not available, the prime factors of n are protected by the factorization problem. On the other hand, were n not available, given the two constants (A, B) to find (p, q) one faces the discrete logarithm problem. Our privacy analysis shall nevertheless identify whether finding p and q will still remain a hard problem given the availability of both n and (A, B). Clearly, we can no longer consider the problem to be those of pure factorization or pure discrete logarithm.

To identify the exact difficulty for finding p, q from n and (A, B), suppose there exists an efficient algorithm A such that with input (g, A, B, n) it will output p and q in time bounded by a polynomial in the size of n. We should keep in mind that A works because the input values are related by $$n \equiv \log_g(A) \log_g(B) \pmod{n}. \tag{12}$$

Were the input values not related in any way then because to date there exists no polynomial-time algorithms to factor integers or to compute discrete logarithms, A should not have output $\log_g(A)$, $\log_g(B)$ in time bounded by any polynomial in the size of n.

For any z with (z, n)=1, (12) is equivalent to $$n \equiv [z \log_g(A)][z^{-1} \log_g(B)] \equiv \log_g(A^z) \log_g(B^{z^{-1}}) \pmod{n}.$$

So with input (g, $A^z$, $B^{z^{-1}}$, n) A should output $\log_g(A^z)$ and $\log_g(B^{z^{-1}})$ in time bounded by a polynomial in the size of n.

Further notice that for any z<q, $A' \equiv A^z \pmod{P}$ forms a permutation in the subgroup generated by A. Analogously for any z'<p, $B' \equiv B^{z'} \pmod{P}$ forms a permutation in the subgroup generated by B. Thus, given an arbitrary quadruple (g, A', B', 1), A forms a decision procedure to answer whether (g, A', B', 1) is a member of the Diffie-Hellman quadruples generated by g.

Theorem 4 Under the assumptions that factorization of n and computing discrete logarithms to the base g are infeasible, finding p, q, from the constants A, B and the modulus n is at least as difficult as solving a decision problem on the membership of the Diffie-Hellman quadruples generated by g.

This membership decision problem is often referred to as Decision-Diffie-Hellman Problem ([15, 18]) and is widely regarded hard.

Performance

The operations in the protocol mainly involve exponentiations modulo big integers and evaluation of Jacobi symbols. Because the cost of the latter is trivial in comparison to that of the former, we shall focus our attention of estimating the cost of modulo exponentiations.

We shall not consider the cost for Alice to generate n and the related prime P=2an+1 since these procedures are purely local to Alice (while a protocol involves communications). She can prepare these two numbers well in advance before running the protocol. However, the cost to Bob of testing the primality of P should be included in the cost for him to run the protocol.

Testing the primality of P using a Monte-Carlo method needs k testing iterations to achieve $\frac{1}{2^k}$ error probability (using k the same as that in the protocol to equalize the error probability). Each iteration mainly involves exponentiation mod P so for this part, Bob performs k exponentiations mod P.

In the proof protocol, in each iteration Alice computes four exponentiations mod P and two of them mod n. Bob performs slightly more: four of them mod P and on average 2.5 of them mod n (2 for c=0 and 3 for c=1). Thus, with a proof of k iterations, Alice computes 4k exponentiations mod P and 2k of them mod n. For Bob's part adding the cost of testing the primality of P, he should perform in total 5k exponentiations mod P and 2.5 of them mod n.

Notice the fact that P=2an+1 where a is small (at the level of $\ln(2n \ln n)$, see Section 3.2). We have $$\log_2 P - \log_2 n \approx \log_2[2 \ln(2n \ln n)]$$

This means that the size of P may exceed that of n by only a few bits (for instance for any n of size less than 10,000 bits, $\log_2[2 \ln(2n \ln n)]<5$, which is less than two percent of the size of n). Since the previous equation renders that the growth of the size difference between the two moduli is much slower than that of the moduli, we can claim that for n any size larger than 512 bits (recommended least size for today), the size of P will not exceed that of n by two percent (of the size of n), namely $$\log_2 P \leq 1.02 \log_2 n.$$

Since in bit operation, the cost for exponentiation mod P is measured in $O((\log_2 P)^3)$, i.e., $C(\log_2 P)^3$ for some constant C, we can use the following to relate the cost of exponentiation mod P to that mod n (of any size larger than 512 bits):

$$(\log_2 P)^3 \leq (1.02 \log_2 n)^3 \approx 1.062(\log_2 n)^3$$

That is, the cost of one exponentiation mod P will not exceed that of one mod n by seven percent. We nevertheless use a ten percent expansion and convert Bob's workload of 5k exponentiations mod P into 5.5k exponentiations mod n. So in total Bob will need to compute no more than 7k of them. Since on average an exponentiation mod n amounts to $1.5\log_2 n$ multiplications mod n, the total cost to Bob for running the protocol will be $12k\log_2 n$ multiplications of integer of size n. We can also use this quantity to bound Alice's cost of running the protocol.

For n of size larger than 512 bits, the computational cost of proving and verifying that n is the product of two primes of roughly equal size using protocol Two_Prime_Product is $12k\log_2 n$ multiplications of integer of size of n. Both parties should perform this number of operations.

Considering the fact that a Monte-Carlo primality test on non-secret number mainly involves modulo exponentiation, Bob's verification cost is equal to eight such tests on non-secret numbers of size n.

We have constructed an efficient knowledge proof protocol for demonstrating an integer being the product of two prime factors of roughly equal size. The new protocol is the first of its kind that proves such a structure with efficiency comparable to that of a Monte-Carlo method for primality evidence "in the dark".

Previous techniques for proving such a structure have a much higher cost for non-Blum integers (as will be discussed below). The improved efficiency for reasoning about non-Blum integers due to this work manifests a particular suitability for using the proposed protocol in the proof of valid RSA keys which are generated at uniformly random (e.g., for the protocol of Blackburn and Galbraith (S. R. Blackburn and S. D. Galbraith. Certification of secure RSA keys, University of Waterloo Centre for Applied Cryptographic Research, Technical Report CORR 90-44.

The cost of a proof amounts to $12k\log_2 n$ multiplications of integers of size of n where k is the number of the iterations in the proof and relates to an error probability bounded by $\max(\frac{1}{2}^k, 24/n^{1/4})$. This is the first protocol that proves the two-prime-product structure of a number with the cost at the level of $O(k\log_2 n)$ multiplications and the error probability at the level of $\frac{1}{2}^k$ (considering k=60, and $n>2^{512}$, $\frac{1}{2}^k >> 24/n^{1/4}$) regardless of whether the number in question is a Blum integer [M. Blum. Coin flipping by telephone: a protocol for solving impossible problems, Proceedings of $24^{th}$ *IEEE Computer Conference (CompCon)*, 1982, pp. 133–137].

What is claimed is:

1. A method of exchanging digital public-key verification data whereby a first party enables a second party to obtain probabilistic evidence that a given public-key number n is the product of exactly two odd primes p and q, not known to the second party, whose bit lengths (l(p), l(q)) differ by not more than d bits; the method including the following steps, all operations being to mod P unless specified mod n, the method being halted should any check fail;

a) said first party provides to said second party a number P such that P is a prime number and n|(P−1);
   b) said second party provides to said first party a number g where $g=f^{(P-1)/n}$ mod P, f<P;
   c) said first party provides to said second party numbers A and B, where $A=g^p$ mod P and $B=g^q$ mod P;
   d) said second party checks that A≠B, A≠1 and B≠1; whereupon the following steps are repeated up to k times;
   e) said second party selects a random number $h \in Z_n^*$ such that $$\left(\frac{h}{n}\right) = -1$$

and provides the number h to the first party;
   f) said first party checks that $$\left(\frac{h}{n}\right) = -1$$

and selects two random numbers u and v such that $l(u)=l((p-1)/2)$, $l(v)=l(q-1)/2)$ and provides to said second party the values $U=g^{2u}$, $V=g^{2v}$, $H_U = B(h^{u \bmod n})$, $H_V = A^{(h^v \bmod n)}$, and $H_{UV} = h^u h^v$ mod n;
   g) said second party sends a request to the first party that the first party provides to the second party values r and s, which the second party randomly specifies should be either:
      (1) r=u and s=v; or
      (2) r=u+(p−1)/2, s=v+(q−1)/2
   h) said first party provides the requested values r and s to the second party,
   i) if the second party requested r=u and s=v, the second party determines whether:
      (1) $l(r) \leq \lfloor l(n)/2 \rfloor + d$, $l(s) \leq \lfloor l(n)/2 \rfloor + d$,
      (2) $g^{2r+1} = Ug$, $g^{2s+1} = Vg$,
      (3) $B^{(h^r \bmod n)} = H_U$, $A^{(h^s \bmod n)} = H_V$, and
      (4) $h^r h^s = H_{UV}$ (mod n);
   thereby verifying the values provided by the first party to the second party are as were required by steps a) to f); or, if the second party requested r=u+(p−1)/2, s=v+(q−1)/2, the second party determines whether:
      (1) $l(r) \leq \lfloor l(n)/2 \rfloor + d$, $l(s) \leq \lfloor l(n)/2 \rfloor + d$,
      (2) $g^{2r+1} = UA$, $g^{2s+1} = VB$,
      (3) $B^{(h^r \bmod n)} = H_U^{\pm 1}$, $A^{(h^s \bmod n)} = H_V^{\mp 1}$ (± and ∓ meaning the two exponents are of opposite sign), and
      (4) $h^r h^s = H_{UV} h^{(n-1)/2}$ (mod n),
   thereby obtaining said probabilistic evidence on whether the given public-key number n is the product of exactly two odd primes p and q whose bit lengths (l(p), l(q)) differ by not more than d bits.

2. A method as claimed in claim 1 in which d≦2.

3. A method as claimed in claim 1 in which at least one of (1) the selections of random numbers is uniformly distributed, or (2) the choice of r and s is uniformly distributed.

4. A computing entity comprising:

a data processing equipments;

a memory; and a communications equipment;

said data processing equipment being configured so as to be capable of processing data according to a set of instructions stored in said memory;

said communications equipment configured so as to communicate data according to said set of instructions such that the computing entity is configured to execute the following steps, wherein n is the product of exactly two odd primes p and q whose bit lengths (l(p), l(q)) differ by not more than d bits and all operations are to mod P unless specified mod n:

a) receive from another computing entity a number P such that P is a prime number and n|(P−1);

b) provide to said other computing entity a number g where $g=f^{(P-1)/n}$ mod P, f<P;

c) receive from said other computing entity numbers A and B, where $A=g^p$ mod P and $B=g^q$ mod P;

d) check that A≠B, A≠1 and B≠1, and, if correct, repeat up to k times steps e) through i);

e) select a random number $h \in Z_n^*$ such that $$\left(\frac{h}{n}\right) = -1$$

and provide the number h to said other computing entity;

f) receive from said other computing entity $U=g^{2u}$, $V=g^{2v}$, $H_U=B^{(h^u \bmod n)}$, $H_V=A^{(h^v \bmod n)}$, and $H_{UV}=h^u h^v$ mod n where u and v are two random numbers such that l(u)=((p−1)/2), l(v)=l((q−1)/2);

g) request the other computing entity to provide values r and s, randomly specified to be either:

(1) r=u and s=v; or (2) r=u+(p−1)/2, s=v+(q−1)/2;

h) receive the requested values r and s from the other computing entity;

i) if r=u and s=v was requested, determine whether:

(1) $l(r) \leq \lfloor l(n)/2 \rfloor + d$, $l(s) \leq \lfloor l(n)/2 \rfloor + d$, (2) $g^{2r+1} = Ug$, $g^{2s+1} = Vg$, (3) $B^{(h^r \bmod n)} = H_U$, $A^{(h^s \bmod n)} = H_V$, and (4) $h^r h^s = H_{UV}$ (mod n);

thereby verifying the values provided by the other computing entity are as were required by steps a) to i); or, if r=u+(p−1)/2, s=v+(q−1)/2 was requested, determine whether:

(1) $l(r) \leq \lfloor l(n)/2 \rfloor + d$, $l(s) \leq \lfloor l(n)/2 \rfloor + d$, (2) $g^{2r+1} = UA$, $g^{2s+1} = VB$, (3) $B^{(h^r \bmod n)} = H_U^{\pm 1}$, $A^{(h^s \bmod n)} = H_V^{\mp 1}$ (± and ∓ meaning the two exponents are of opposite sign), and (4) $h^r h^s = H_{UV} h^{(n-1)/2}$ (mod n)

thereby obtaining probabilistic evidence on whether the given public-key number n is the product of said exactly two odd primes p and q whose bit lengths (l(p), l(q)) differ by not more than d bits.

5. A computing entity as claimed in claim 4 in which d≦2.

6. A computing entity as claimed in claim 4 in which at least one of (1) the selections of random numbers is uniformly distributed, or (2) the choice of r and s is uniformly distributed.

7. A computer storage medium having stored thereon a computer program readable by a general purpose computer, the computer program including instructions for said general purpose computer to configure it to be as said computing entity as claimed in claim 4.

8. A computing entity comprising:

a data processing equipment;

a memory; and a communications equipment;

said data processing equipment being configured so as to be capable of processing data according to a set of instructions stored in said memory;

said communications equipment configured so as to communicate data according to said set of instructions such that the computing entity is configured to execute the following steps, wherein n is the product of exactly two odd primes p and q whose bit lengths (l(p), l(q)) differ by not more than d bits and all operations are to mod P unless specified mod n:

a) provide to another computing entity a number P such that P is a prime number and n|(P−1);

b) receive from the other computing entity a number g where $g=f^{(P-1)/n}$ mod P, f<P;

c) provide to said other computing entity numbers A and B, where $A=g^p$ mod P and $B=g^q$ mod P;

d) receive from said other computing entity a random number $h \in Z_n^*$ such that $$\left(\frac{h}{n}\right) = -1;$$

e) check that $$\left(\frac{h}{n}\right) = -1$$

and, if so, select two random numbers u and v such that l(u)=l((p−1)/2), l(v)=l((q−1)/2) and provide to said other computing entity the values $U=g^{2u}$, $V=g^{2v}$, $H_U=B^{(h^u \bmod n)}$, $H_V=A^{(h^v \bmod n)}$ and $H_{UV}=h^u h^v$ mod n;

f) receive from said other computing entity a request to provide to said other computing entity values r and s, which said other computing entity randomly specifies should be either:

(1) r=u and s=v; or (2) r=u+(p−1)/2, s=v+(q−1)/2 g) provide the requested values r and s to said other computing entity.

9. A computing entity as claimed in claim 8 in which d≦2.

10. A method computing entity as claimed in claim 8 in which at least one of the selections of random numbers is uniformly distributed.

11. A computer storage medium having stored thereon a computer program readable by a general purpose computer, the computer program including instructions for said general purpose computer to configure it to be as said computing entity as claimed in claim 8.

12. A system of co-operating computer entities, including:

a first computing entity comprising:

a data processing equipment;

a memory; and a communications equipment;

said data processing equipment being configured so as to be capable of processing data according to a set of instructions stored in said memory;

said communications equipment configured so as to communicate data according to said set of instructions such that the first computing entity is configured to execute the following steps, wherein n is the product of exactly two odd primes p and q whose bit lengths (l(p), l(q)) differ by not more than d bits and all operations are to mod P unless specified mod n:

a) receive from a second computing entity a number P such that P is a prime number and n|(P−1);
b) provide to said second computing entity a number g where $g = f^{(P-1)/n}$ mod P, f<P;
c) receive from said second computing entity numbers A and B, where $A = g^p$ mod P and $B = g^q$ mod P;
d) check that A≠B, A≠1 and B≠1, and, if correct, repeat up to k times steps e) through i);
e) select a random number $h \in Z_n^*$ such that $$\left(\frac{h}{n}\right) = -1$$

and provide the number h to said second computing entity;
f) receive from said second computing entity $U = g^{2u}$, $V = g^{2v}$, $H_U = B^{(h^u \bmod n)}$, $H_V = A^{(h^v \bmod n)}$, and $H_{UV} = h^u h^v$ mod n where u and v are two random numbers such that l(u)=l((p−1)/2), l(v)=l((q−1)/2);
g) request the second computing entity to provide values r and s, randomly specified to be either:
  (1) r=u and s=v; or
  (2) r=u+(p−1)/2, s=v+(q−1)/2;
h) receive the requested values r and s from the second computing entity;
i) if r=u and s=v was requested, determine whether:
  (1) $l(r) \leq \lfloor l(n)/2 \rfloor + d$, $l(s) \leq \lfloor l(n)/2 \rfloor + d$,
  (2) $g^{2r+1} \equiv Ug$, $g^{2s+1} \equiv Vg$,
  (3) $B^{(h^r \bmod n)} \equiv H_U$, $A^{(h^s \bmod n)} \equiv H_V$, and
  (4) $h^r h^s \equiv H_{UV} (\bmod n)$;

thereby verifying the values provided by the second computing entity are as were required by steps a) to i); or, if r=u+(p−1)/2, s=v+(q−1)/2 was requested, determine whether:
  (1) $l(r) \leq \lfloor l(n)/2 \rfloor + d$, $l(s) \leq \lfloor l(n)/2 \rfloor + d$,
  (2) $g^{2r+1} \equiv UA$, $g^{2s+1} \equiv VB$,
  (3) $B^{(h^r \bmod n)} \equiv H_U^{\pm 1}$, $A^{(h^s \bmod n)} \equiv H_V^{\mp 1}$ (± and ∓ meaning the two exponents are of opposite sign), and
  (4) $h^r h^s \equiv H_{UV} h^{(n-1)/2} (\bmod n)$ thereby obtaining probabilistic evidence on whether the given public-key number n is the product of said exactly two odd primes p and q whose bit lengths (l(p), l(q)) differ by not more than d bits; and said second computing entity comprising:
a data processing equipment;
a memory; and
a communications equipment;
said data processing equipment being configured so as to be capable of processing data according to a set of instructions stored in said memory;
said communications equipment configured so as to communicate data according to said set of instructions such that the second computing entity is configured to execute the following steps, wherein n is the product of exactly two odd primes p and q whose bit lengths (l(p), l(q)) differ by not more than d bits and all operations are to mod P unless specified mod n:

a) provide to said first computing entity the number P;
b) receive from the first computing entity the number g;
c) provide to said first computing entity numbers A and B;
d) receive from said first computing entity the random number $h \in Z_n^*$;
e) check that $$\left(\frac{h}{n}\right) = -1$$

and, if so, select two random numbers u and v such that l(u)=l((p−1)/2), l(v)=l((q−1) 2) and provide to said first computing entity the values of $U = g^{2u}$, $V = g^{2v}$, $H_U = B^{(h^u \bmod n)}$, $H_V = A^{(h^v \bmod n)}$, and $H_{UV} = h^u h^v$ mod n
f) receive from said first computing entity a request to provide to said first computing entity values r and s, which said first computing entity randomly specified should be either:
  (1) r=u and s=v; or
  (2) r=u+(p−1)/2, s=v+(q−1)/2; and
g) provide the requested values r and s to said first computing entity.

13. A communication system comprising at least a pair of computing entities as claimed in claim 12 and a communications medium, each of said pair of computing entities being arranged to communicate with the other computing entity via the communications medium.

14. A communication system as claimed in claim 13 in which said communications medium includes one or more of any of the internet, local area network, wide area network, virtual private circuit or public telecommunications network.

* * * * *